United States Patent
Yang et al.

(10) Patent No.: US 12,200,519 B2
(45) Date of Patent: Jan. 14, 2025

(54) MULTI-ACCESS POINT JOINT DATA TRANSMISSION METHOD AND DEVICE, AND COMPUTER-READABLE STORAGE MEDIUM

(71) Applicant: ZTE CORPORATION, Shenzhen (CN)

(72) Inventors: Dan Yang, Shenzhen (CN); Ning Wei, Shenzhen (CN); Nan Li, Shenzhen (CN); Bo Sun, Shenzhen (CN); Zhiqiang Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 237 days.

(21) Appl. No.: 17/642,650

(22) PCT Filed: Sep. 7, 2020

(86) PCT No.: PCT/CN2020/113722
§ 371 (c)(1),
(2) Date: Mar. 11, 2022

(87) PCT Pub. No.: WO2021/047468
PCT Pub. Date: Mar. 18, 2021

(65) Prior Publication Data
US 2022/0330059 A1   Oct. 13, 2022

(30) Foreign Application Priority Data
Sep. 12, 2019   (CN) .......................... 201910866096.2

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
CPC . H04W 24/08; H04W 24/10; H04W 28/0205; H04W 28/06; H04W 72/27;
(Continued)

(56) References Cited

U.S. PATENT DOCUMENTS

2018/0006866 A1* 1/2018 Trainin ............... H04W 74/002
2018/0317128 A1* 11/2018 Chun ................... H04L 5/0055
(Continued)

FOREIGN PATENT DOCUMENTS

CN       105704827 A     6/2016
CN       108811161 A    11/2018
(Continued)

OTHER PUBLICATIONS

International Search Report for Application No. PCT/CN2020/113722, dated Dec. 1, 2020, 4 pages including English translation.
(Continued)

*Primary Examiner* — Rushil P. Sampat
(74) *Attorney, Agent, or Firm* — Morgan, Lewis & Bockius LLP

(57) ABSTRACT

Provided are a transmission method and device, and a computer-readable storage medium. The transmission method includes: sending, by a first communication node, a notification frame, where the notification frame is used for instructing at least one second communication node to send a first physical layer protocol data unit (PPDU); and receiving, by the first communication node, the first PPDU sent by the at least one second communication node.

15 Claims, 14 Drawing Sheets

(58) Field of Classification Search
CPC ...... H04W 88/08; H04W 88/12; H04B 7/024; H04L 5/0035; H04L 5/0091
See application file for complete search history.

(56) References Cited

U.S. PATENT DOCUMENTS

2020/0037275 A1* 1/2020 Liu ................. H04L 5/0048
2020/0077273 A1* 3/2020 Cherian ............ H04W 16/14
2021/0127290 A1* 4/2021 Yang ............... H04W 72/27

FOREIGN PATENT DOCUMENTS

| CN | 109714092 A | 5/2019 |
| WO | WO-2019051338 A1 | 3/2019 |
| WO | WO 2007/007128 A1 * | 1/2020 |

OTHER PUBLICATIONS

Hewlett Packard Enterprise, "Further Implication of Wi-Fi Field Measurements for Multi-Node Testing", *3GPP TSG-RAN WG4 Meeting* #82 R4-1701870, Feb. 17, 2017, entire document.
Extended European Search Report for Application No. 20862117.7, dated Sep. 7, 2023, 12 pages.
Sungjin PARK et al., "Multi-AP Transmission Procedure", IEEE-SA Mentor, Piscataway, NJ USA, vol. 802.11 EHT, Mar. 12, 2019 (Mar. 11, 2019), pp. 1-18, XP068148191.

* cited by examiner

MULTI-ACCESS POINT JOINT DATA TRANSMISSION METHOD AND DEVICE, AND COMPUTER-READABLE STORAGE MEDIUM

CROSS-REFERENCES TO RELATED APPLICATIONS

This application is a national stage application filed under 35 U.S.C. 371 based on International Patent Application No. PCT/CN2020/113722, filed on Sep. 7, 2020, which claims priority to Chinese Patent Application No. 201910866096.2 filed with the China National Intellectual Property Administration (CNIPA) on Sep. 12, 2019, the disclosures of which are incorporated herein by reference in their entireties.

TECHNICAL FIELD

The present disclosure relates to radio communication networks, for example, to a transmission method and device, and a computer-readable storage medium.

BACKGROUND

A station (STA) is associated with only one access point (AP), only performs data transmission with the AP associated with the STA itself, and only performs channel measurement with the AP associated with the STA itself. In the next generation of wireless local area networks (WLAN), in order to improve the transmission efficiency, multiple AP structures need to be supported, and multiple APs may perform joint or cooperative transmission. In some application scenarios, an STA needs to perform channel measurement with multiple APs.

SUMMARY

The present application provides a transmission method and device, and a computer-readable storage medium, which can implement the channel measurement or data transmission between an STA and multiple APs, thereby improving the transmission efficiency.

An embodiment of the present application provides a transmission method. The method includes the following.

A first communication node sends a notification frame, where the notification frame is used for instructing at least one second communication node to send a first physical layer protocol data unit (PPDU).

The first communication node receives the first PPDU sent by the at least one second communication node.

An embodiment of the present application further provides a transmission method. The method includes the following.

A second communication node receives a notification frame sent by a first communication node.

The second communication node sends a first PPDU to the first communication node.

An embodiment of the present application further provides a transmission method. The method includes the following.

A third communication node sends a request frame, where the request frame is used for instructing at least one first communication node to send a notification frame.

An embodiment of the present application further provides a transmission device. The transmission device includes a processor, which is configured to, when executing a computer program, perform the transmission method in any of the embodiments described above.

An embodiment of the present application further provides a computer-readable storage medium. The computer-readable storage medium is configured to store a computer program which, when executed by a processor, performs the transmission method in any of the embodiments described above.

DETAILED DESCRIPTION

Embodiments of the present application are described hereinafter in detail in conjunction with the drawings.

With the development of wireless network technology, the performance of wireless networks is constantly being improved, and the reliability requirements of users for wireless transmission are also constantly being improved.

Figure 1:
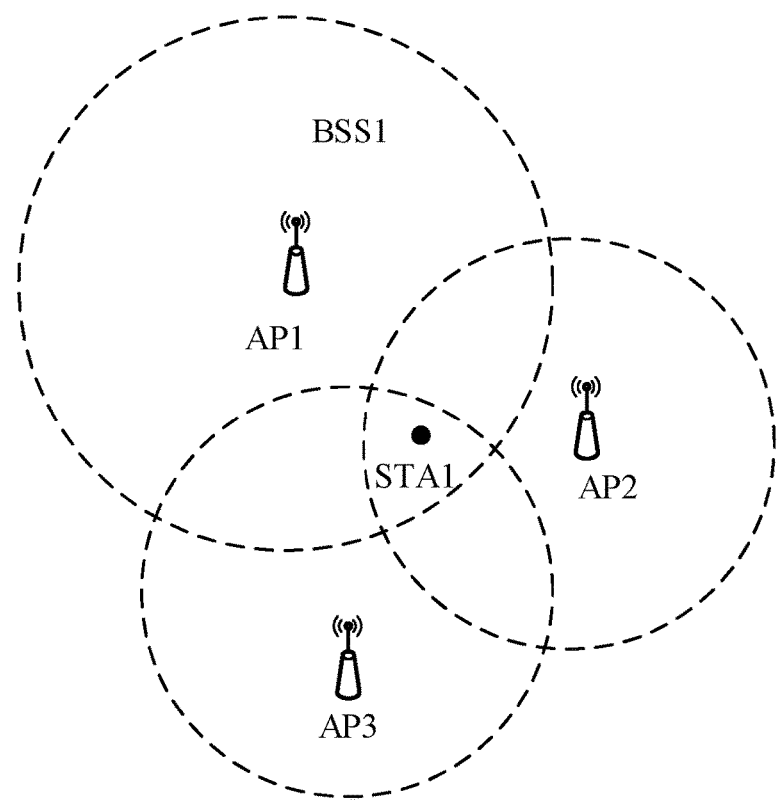
FIG. 1 is an architecture diagram of a wireless network according to an embodiment.

The common device in wireless networks usually includes APs and non-APs (such as STAs). An AP establishes a basic service set (BSS), and multiple BSS may exist in a wireless network. One STA is associated with an AP through processes of scanning, authentication, and association, and communicates with the AP or communicates with other STAs through the AP. FIG. 1 is an architecture diagram of a wireless network according to an embodiment. As shown in FIG. 1, the wireless network includes an AP1, an AP2, an AP3, and an STA1, and the STA1 is in the coverage area of all the AP1, the AP2 and the AP3. The STA1 is associated with the AP1 and not with the AP2 or the AP3. The AP1 establishes a BSS1, and the AP1 and the STA1 are both in the BSS1.

In order to improve the transmission efficiency, multiple AP structures are supported in the next-generation wireless network, and multiple AP may perform joint or cooperative transmission. In some application scenarios, for example, the multi-access point operation (also known as the multi-AP operation) often has data transmission requirements such as joint data transmission, or when there is a need to use beamforming for the multi-AP joint data transmission or the multi-AP cooperative transmission needs to be subjected to interference cancellation, an STA needs to perform channel measurement with multiple APs, that is, there is a need to perform channel measurement under the multi-access point operation. However, the correlation mechanism only supports an STA to perform data transmission with APs associated with the STA itself and perform channel measurement with the associated APs. Therefore, how to achieve at least one of channel measurement or wireless frame transmission between an STA and multiple APs (including at least one of associated APs and non-associated APs) under the multi-access point operation is an urgent problem to be solved.

An embodiment of the present application provides a mobile communication network (including but not limited to the fifth-generation mobile communication network (5G)). The network architecture of the network may include network-side devices (for example, one or more types of base stations, transmission nodes, access points (APs), relays, Node B (NB), universal terrestrial radio access (UTRA), evolved universal terrestrial radio access (EUTRA), and the like) and terminals (user equipments (UEs), user equipment data cards, relays, mobile devices, and the like). In the embodiments of the present application, a transmission method executable on the preceding network architecture, a transmission device, and a computer-readable storage medium are provided, which can implement the channel measurement or data transmission between an STA and multiple APs, thereby improving the transmission efficiency.

The transmission method and device and technical effects thereof will be described below.

Figure 2:
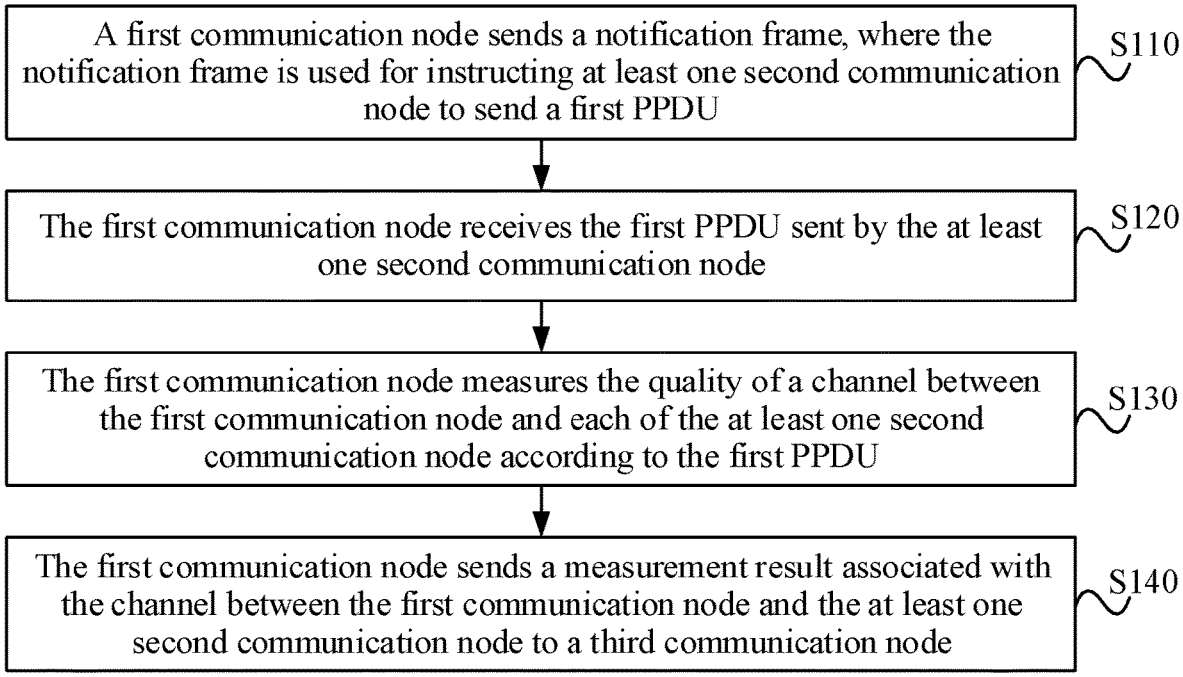
FIG. 2 is a flowchart of a transmission method according to an embodiment.

FIG. 2 is a flowchart of a transmission method according to an embodiment. As shown in FIG. 2, the method provided by this embodiment is applicable to a first communication node, and the first communication node may be an STA (such as a network side device (such as an AP), a non-AP station or a UE). The method includes S110 and S120.

In S110, a first communication node sends a notification frame, where the notification frame is used for instructing at least one second communication node to send a first PPDU.

In an embodiment, the first PPDU includes a channel sounding PPDU or a data frame.

In an embodiment, the notification frame may be actively sent by the first communication node, and may also be sent by the first communication node under the trigger of a third communication node, that is, the first communication node receives a request frame sent by the third communication node, and the request frame is used for instructing the first communication node to start a multi-access point operation or send the notification frame.

In an embodiment, the notification frame may include at least one of: resource allocation information, access point identification information, related information of the first PPDU, public information, user information, a multi-access point operation indication or an indication of whether to decode a media access control (MAC) frame header or a PPDU load portion of the notification frame.

In an embodiment, the notification frame may further include data frame-related information. The data frame-related information may be at least one of signaling information or a transmission rate used for constructing a data frame. When the data frame-related information includes a transmission rate, the transmission rate is used for indicating a transmission rate used when the second communication node sends the data frame.

In an embodiment, the notification frame may further include related information for constructing an acknowledgement frame, and the related information for constructing the acknowledgement frame includes at least one of: BSS identification information, a sender address, a receiver address, duration information or modulation and coding scheme (MCS) information for sending the acknowledgement frame.

In an embodiment, the notification frame includes the resource allocation information, the resource allocation information is used for indicating information of a resource used by the at least one second communication node for sending the first PPDU, the resource is a frequency domain resource, a spatial domain resource, a time domain resource or a code domain resource, and the resource allocation information is notified by an associated access point of the first communication node, constructed by the first communication node, or predefined.

In an embodiment, the notification frame includes the access point identification information, the access point identification information is used for indicating an identification of a second communication node that is desired to send the first PPDU, and the access point identification information is a MAC address of the at least one second communication node, an identification of a BSS where the at least one second communication node is located or a group member identification negotiated by the associated access point of the first communication node and the at least one second communication node. For example, before a multi-access point channel measurement process is started, or before a multi-access point data transmission process is started, before a multi-access point cooperative transmission process is started, or during a multi-access point operation establishment process or other processes, multiple access points are formed into a group, and the group or access points in the group are allocated group member identification information. The number of pieces of access point identification information included in the notification frame may be one or more.

In an embodiment, the notification frame includes the related information of the first PPDU, the related information of the first PPDU is used for indicating composition information of the first PPDU sent by the at least one second communication node, and the composition information includes at least one of: signaling information used for constructing the first PPDU, short training sequence information, long training sequence information or a transmission rate.

In an embodiment, the notification frame includes the multi-access point operation indication, and the multi-access point operation indication is at least one of: a multi-access point operation type, starting a multi-access point operation, stopping a multi-access point operation, starting multi-access point channel measurement, stopping multi-access point channel measurement, starting multi-access point joint data transmission, stopping multi-access point joint data transmission, starting multi-access point cooperative data transmission, stopping multi-access point cooperative data transmission, starting multi-access point selection, stopping multi-access point selection, start time of a multi-access point operation, a duration of a multi-access point operation, end time of a multi-access point operation or a start time offset of a multi-access point operation.

In an embodiment, the multi-access point operation type includes at least one of: multi-access point channel measurement, multi-access point joint data transmission, multi-access point cooperative transmission, multi-access point selection, multi-access point cooperative beamforming or multi-access point cooperative interference cancellation.

In an embodiment, the notification frame includes the public information, the common information is used for indicating the same parameter information required to be used by the at least one second communication node when sending the first PPDU respectively, and the same parameter information includes at least one of the following information: a downlink length indication, a more notification frame indication, an indication of whether the second communication node needs to perform channel detection, a downlink bandwidth indication, a coding indication, a transmission power indication, a reception power indication or signaling domain information of the first PPDU.

In an embodiment, the notification frame includes the user information, the user information is used for indicating parameter information used by the at least one second communication node to send the first PPDU, and the parameter information includes at least one of the following information: an access point identification, bandwidth information, a transmission rate or coding information. The number of pieces of user information included in the notification frame may be one or more.

In S120, the first communication node receives the first PPDU sent by the at least one second communication node.

In an embodiment, before the execution of S120, the first communication node may also receive a second PPDU sent by the at least one second communication node, where the second PPDU includes a control frame or a channel measurement notification frame.

The control frame includes any one of: an acknowledgement frame, a request-to-send frame (RTS) or a clear-to-send frame (CTS).

After the completion of the execution of S120, with reference to FIG. 2, if the first PPDU includes the channel sounding PPDU, the method further includes S130 and S140.

In S130, the first communication node measures the quality of a channel between the first communication node and each of the at least one second communication node according to the first PPDU.

In S140, the first communication node sends a measurement result associated with the channel between the first communication node and the at least one second communication node to a third communication node.

In an embodiment, after the completion of the execution of S120, if the first PPDU includes the data frame, the first communication node may send an acknowledgement frame of the data frame to the third communication node.

Figure 3:
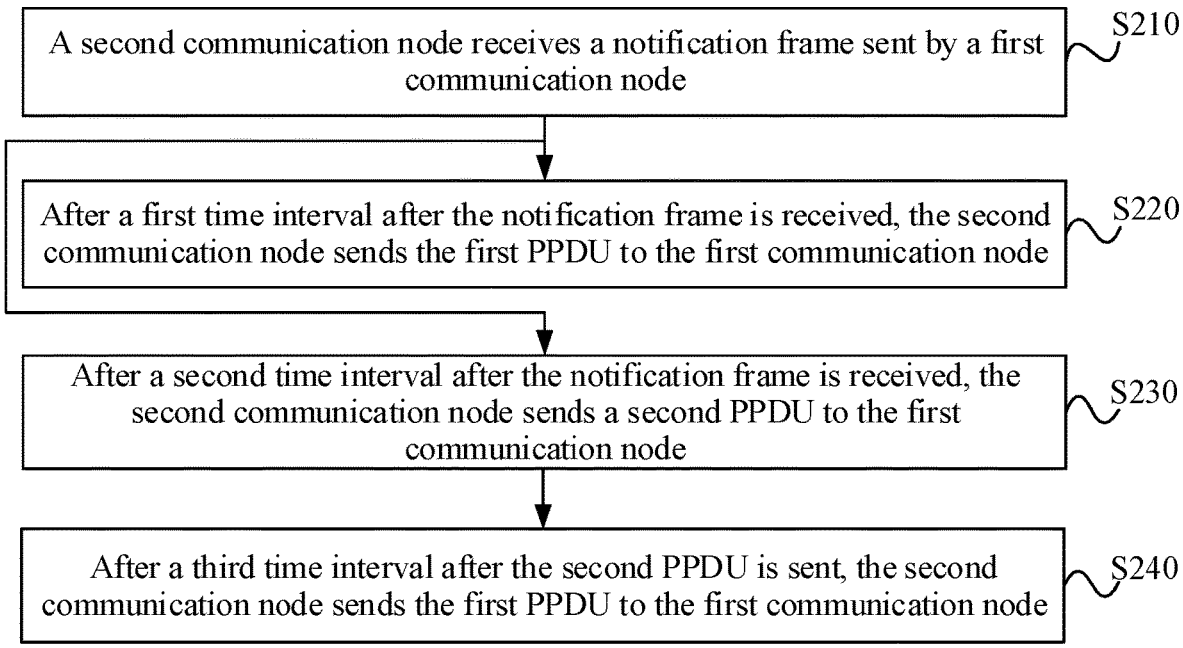
FIG. 3 is a flowchart of another transmission method according to an embodiment.

FIG. 3 is a flowchart of another transmission method according to an embodiment. As shown in FIG. 3, the method provided by this embodiment is applicable to a second communication node, and the second communication node may be a non-associated AP of an STA or an associated AP of the STA. The method includes S210.

In S201, a second communication node receives a notification frame sent by a first communication node.

The notification frame is used for instructing the second communication node to send the first PPDU to the first communication node.

In an embodiment, the first PPDU includes a channel sounding PPDU or a data frame.

In an embodiment, the notification frame includes at least one of: resource allocation information, access point identification information, related information of the first PPDU, public information, user information, a multi-access point operation indication or an indication of whether to decode a MAC frame header or a PPDU load portion of the notification frame.

In an embodiment, the notification frame includes the resource allocation information, the second communication node sends the first PPDU on a resource indicated by the resource allocation information, where the resource is a frequency domain resource, a spatial domain resource, a time domain resource or a code domain resource.

In an embodiment, the notification frame includes the access point identification information, the second communication node determines whether to send the first PPDU according to whether the access point identification information includes an access point identification of the second communication node or whether the access point identification information matches the access point identification of the second communication node.

In an embodiment, the notification frame includes the related information of the first PPDU, the second communication node constructs the first PPDU to be sent according to the related information of the first PPDU. For example, a signaling domain of the first PPDU is constructed using signaling information in the related information of the first PPDU, a short training sequence domain of the first PPDU is constructed using short training sequence information, a long training sequence domain of the first PPDU is constructed using long training sequence information, and the first PPDU is sent using a data rate carried in the related information of the first PPDU.

In an embodiment, the notification frame includes the public information, and the second communication node uses parameter information indicated by the public information when sending the first PPDU. For example, when the public information includes a downlink length indication, the length of the first PPDU sent by the second communication node is the value indicated by the downlink length indication; when the public information includes an indication of whether an access point needs to perform channel detection, the second communication node needs to perform or not perform channel detection before sending the first PPDU according to the indication; and when the public information includes a transmission power indication or a reception power indication, the second communication node needs to determine its own transmission power according to the indicated value.

In an embodiment, the notification frame includes at least one piece of user information, and the second communication node determines whether user information corresponding to the second communication node and parameter information used by the second communication node when sending the first PPDU are included. For example, the second communication node may determine whether the current notification frame includes the user information corresponding to the second communication node according to whether an access point identification included in the at least one piece of user information matches an identification of the second communication node. The second communication node sends the first PPDU according to a parameter of user information corresponding to the second communication node. For example, the second communication node sends the first PPDU on an indicated bandwidth according to bandwidth information, or sends the first PPDU according to a transmission rate, or encodes the first PPDU according to coding information.

In an embodiment, in a case where the notification frame includes a multi-access point operation indication and the multi-access point operation indication includes a multi-access point operation type, the second communication node performs multi-access point channel measurement, multi-access point joint data transmission, multi-access point cooperative transmission, multi-access point selection, multi-access point cooperative beamforming or multi-access point cooperative interference cancellation according to the multi-access point operation type.

In an embodiment, when the notification frame includes the multi-access point operation indication and the multi-access point operation indication includes starting a multi-access point operation or stopping a multi-access point operation, the second communication node starts the multi-access point operation or stops the multi-access point operation after receiving the notification frame.

In an embodiment, when the notification frame includes the multi-access point operation indication and the multi-access point operation indication includes start time of a multi-access point operation, the second communication node starts to perform the multi-access point operation at the start time of the multi-access point operation after receiving the notification frame.

In an embodiment, when the notification frame includes the multi-access point operation indication and the multi-access point operation indication includes a start time offset of a multi-access point operation, the second communication node starts to perform the multi-access point operation at the start time offset of the multi-access point operation after receiving the notification frame.

In an embodiment, when the notification frame includes the multi-access point operation indication and the multi-access point operation indication includes a duration of a multi-access point operation or end time of a multi-access point operation, the second communication node stops the multi-access point operation at the end time of the multi-access point operation or after the duration of the multi-access point operation.

In an embodiment, when the second communication node receives a notification frame from a non-associated station or another AP, in a case where a sender identification or a BSS identification carried in the notification frame is a public identification or an indication that the MAC header or PPDU load part of the notification frame needs to be further decoded is carried in the notification frame, the second communication node needs to continue decoding the MAC header or PPDU load part of the notification frame to obtain the information carried in the notification frame.

After the completion of the execution of S210, with reference to FIG. 3, the method may further include S220 or include S230 and S240, that is, when the completion of the execution of S210, S220 may be executed, or S230 and S240 may be executed in sequence.

In S220, after a first time interval after the notification frame is received, the second communication node sends the first PPDU to the first communication node.

In an embodiment, the first time interval may be, but is not limited to, a short interframe space or a point coordination function interframe space.

In S230, after a second time interval after the notification frame is received, the second communication node sends a second PPDU to the first communication node, where the second PPDU includes a control frame or a channel measurement notification frame.

In an embodiment, the control frame includes any one of: an acknowledgement frame, an RTS or a CTS.

In an embodiment, the control frame or the channel measurement notification frame includes at least one of: at least one station identification, a multi-user feedback indication, a single-user feedback indication, a space-time flow location index or channel reservation indication information.

In an embodiment, the control frame or the channel measurement notification frame includes the channel reservation indication information for setting network allocation vectors of other stations surrounding the second communication node or for the second communication node to reserve a channel of a corresponding duration.

In an embodiment, the control frame or the channel measurement notification frame is sent using a bandwidth equal to or less than the bandwidth used for sending the notification frame or a bandwidth equal to or greater than the bandwidth used for sending the first PPDU.

In an embodiment, multiple second communication nodes send the same control frame or channel measurement notification frame using the same bandwidth.

In S240, after a third time interval after the second PPDU is sent, the second communication node sends the first PPDU to the first communication node.

In an embodiment, the second time interval may be, but is not limited to, a short interframe space or a point coordination function interframe space, and the third time interval may be, but is not limited to, a short interframe space or a point coordination function interframe space. In an embodiment, the values of the first time interval, the second time interval and the third time interval may be the same or different.

Figure 4:
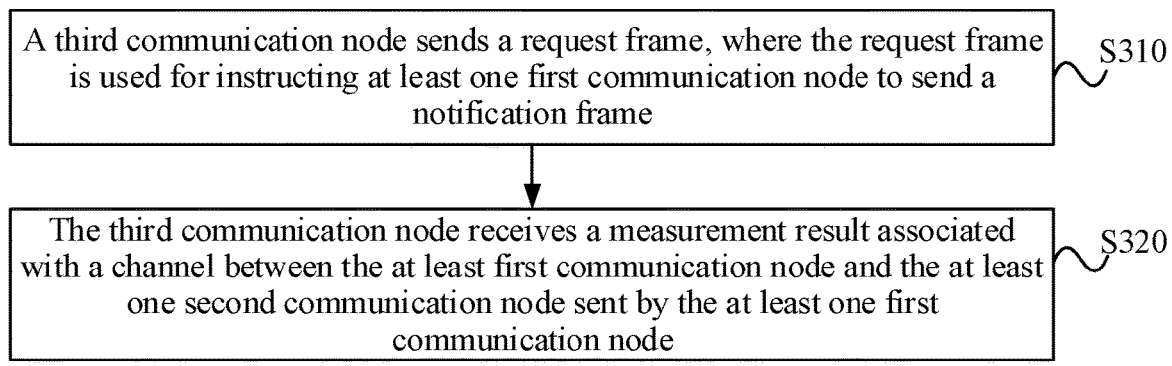
FIG. 4 is a flowchart of another transmission method according to an embodiment.

FIG. 4 is a flowchart of another transmission method according to an embodiment. As shown in FIG. 4, the method provided by this embodiment is applicable to a third communication node, and the third communication node may be an associated AP of an STA. The method includes S310 and S320.

In S310, a third communication node sends a request frame, where the request frame is used for instructing at least one first communication node to send a notification frame.

In an embodiment, the request frame includes at least one of: access point identification information, duration information, resource allocation information, related information of a first PPDU, a channel measurement start indication, station information, a multi-access point operation indication or a buffer data ready-to-send indication.

In an embodiment, the notification frame is used for instructing at least second communication node to send the first PPDU, and the first PPDU includes a channel sounding PPDU or a data frame.

In an embodiment, in a case where the request frame includes the access point identification information, the access point identification information is used for indicating that the at least one first communication node sends the notification frame to an access point identified by the access point identification information, that a multi-access point operation with the access point identified by the access point identification information is started or stopped, or that the access point identified by the access point identification information starts or stops the multi-access point operation.

In an embodiment, the request frame includes the duration information, and the duration information is used for indicating the duration of a reserved transmission opportunity or the duration of a reserved occupied channel.

In an embodiment, the request frame includes the resource allocation information, and the resource allocation information is used for indicating resource information used by the second communication node to send the first PPDU.

In an embodiment, the notification frame includes the related information of the first PPDU, and the related information of the first PPDU is used by the second communication node to construct the first PPDU.

In an embodiment, the request frame includes the channel measurement start indication, and the channel measurement start indication is used for indicating that a multi-access point operation indication in the notification frame sent by the at least one first communication node is set to perform multi-access point channel measurement, or for indicating that the second communication node sends a channel sounding PPDU.

In an embodiment, the request frame includes the station information, and the station information is used for indicating a desired first communication node.

In an embodiment, the request frame includes the multi-access point operation indication, and the multi-access point operation indication is used for indicating at least one of: a multi-access point operation type, starting a multi-access point operation, stopping a multi-access point operation, starting multi-access point channel measurement, stopping multi-access point channel measurement, starting multi-access point joint data transmission, stopping multi-access point joint data transmission, starting multi-access point cooperative data transmission, stopping multi-access point cooperative data transmission, starting multi-access point selection, stopping multi-access point selection, start time of a multi-access point operation, a duration of a multi-access point operation, end time of a multi-access point operation or a start time offset of a multi-access point operation.

In an embodiment, the request frame includes the buffer data ready-to-send indication, and the buffer data ready-to-send indication is used for indicating that the third communication node has buffered data of the at least one first communication node to send, for indicating starting multi-access point joint data transmission, or for indicating starting multi-access point cooperative data transmission.

In S320, the third communication node receives a measurement result associated with a channel between the at least first communication node and the at least one second communication node sent by the at least one first communication node.

S320 is that the first communication node sends a channel measurement result after the first communication node measures the quality of a channel between the first communication node and each second communication node according to the first PPDU sent by the second communication node, where the first PPDU includes a channel sounding PPDU.

In an embodiment, if the first PPDU includes a data frame, the third communication node may further receive an acknowledgement frame of the first PPDU sent by the first communication node, and the acknowledgement frame is an acknowledgement of the first PPDU, which is sent by the first communication node according to whether the first PPDU sent from the second communication node is correctly received.

Some exemplarily embodiments are listed below to illustrate the transmission method provided by the embodiments of the present application.

In an embodiment, since the third communication node is usually an associated station of the first communication node (when the first communication node is a non-AP station), the second communication node mentioned in the present application may or may not include the third communication node.

In a first example embodiment, the architecture of a wireless network is shown in FIG. 1, in which the first communication node is STA1, the second communication node is a non-associated AP of STA1 (that is, at least one of AP2 or AP3), and the third communication node is an associated AP of STA1 (that is, AP1).

Figure 5:
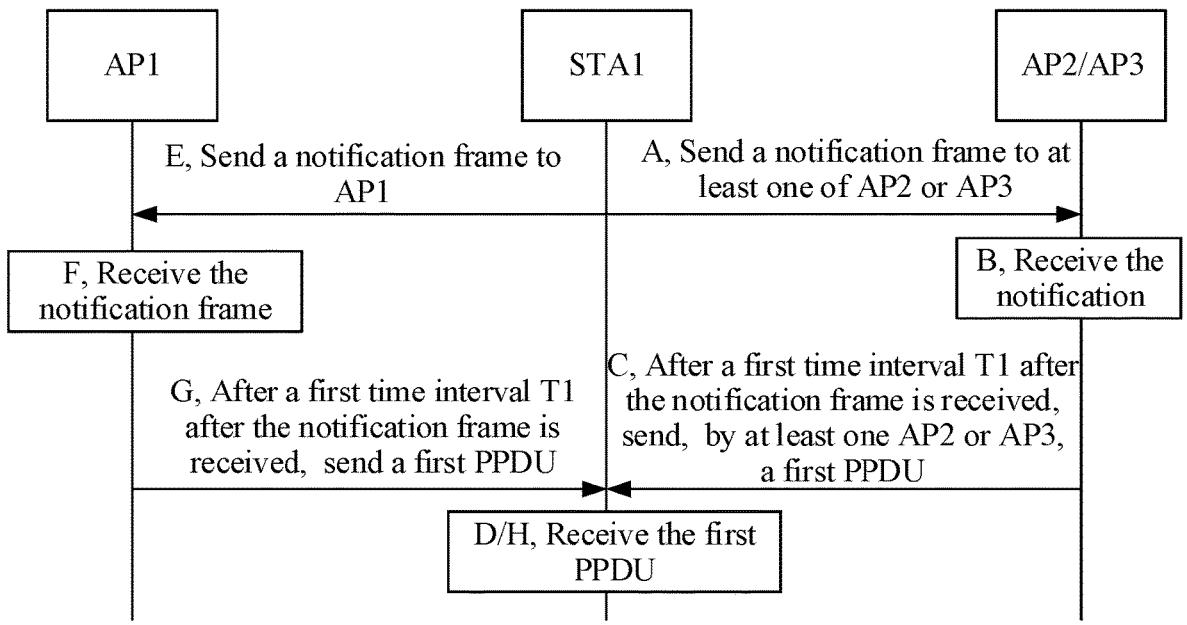
FIG. 5 is an interaction diagram of a transmission method according to an embodiment.

FIG. 5 is an interaction diagram of a transmission method according to an embodiment. As shown in FIG. 5, the method includes A, B, C, D, E, F, G, and H.

In A, STA1 sends a notification frame to at least one of AP2 or AP3.

In B, at least one of AP2 or AP3 receives the notification frame sent by STA1.

In an embodiment, the notification frame may be a broadcast address frame, a multicast address frame or a unicast frame. When the notification frame is the multicast address frame, the multicast address may be a multicast address or group identity of a group where AP2 and AP3 are located.

In C, after a first time interval T1 after the notification frame is received, at least one AP2 or AP3 sends a first PPDU to STA1.

In D, STA1 receives the first PPDU sent by at least one of AP2 or AP3.

Figure 6:
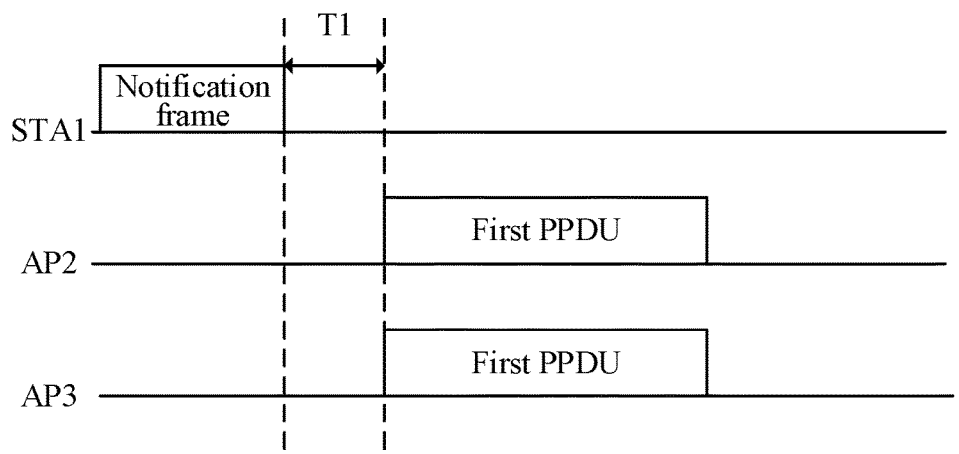
FIG. 6 is a frame interaction sequence diagram of a transmission method according to an embodiment.

FIG. 6 is a frame interaction sequence diagram of a transmission method according to an embodiment. As shown in FIG. 6, after the first time interval T1 after STA1 sends the notification frame, AP2 and AP3 send first PPDUs.

With continued reference to FIG. 5, on the basis of the transmission method provided herein, the receiver of the notification frame may also include an associated AP (that is, AP1) of the STA1.

In E, STA1 sends a notification frame to AP1.

In F, AP1 receives the notification frame sent by STA1.

In an embodiment, the notification frame may be a broadcast address frame, a multicast address frame or a unicast frame. When the receiver of the notification frame includes AP1 and the notification frame is a multicast address frame, the multicast address may be a multicast address or group identity of a group where AP1 to AP3 are located.

In G, after a first time interval T1 after the notification frame is received, AP1 sends a first PPDU to STA1.

In H, STA1 receives the first PPDU sent by AP1.

Figure 7:
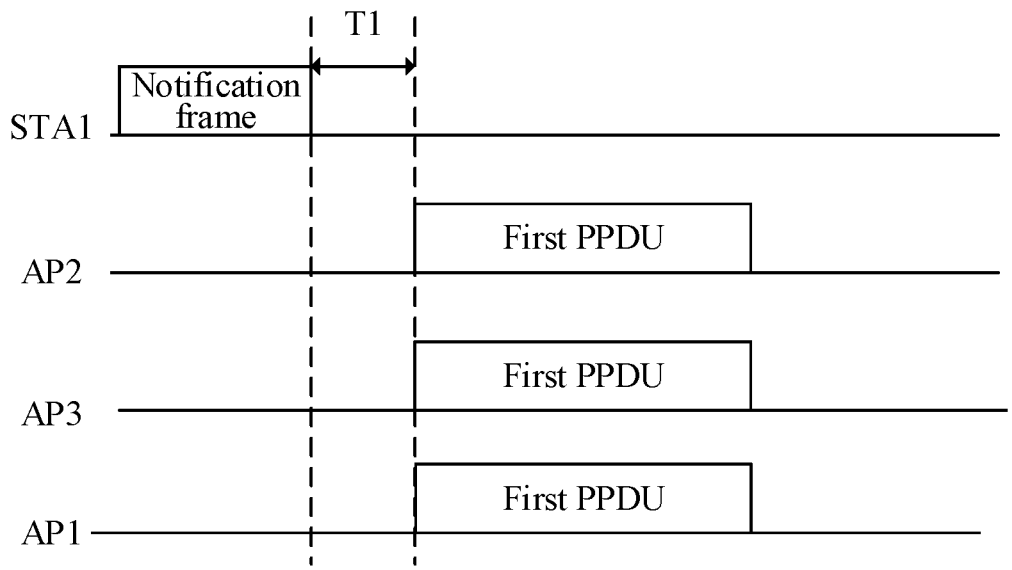
FIG. 7 is a frame interaction sequence diagram of another transmission method according to an embodiment.

FIG. 7 is a frame interaction sequence diagram of another transmission method according to an embodiment. As shown in FIG. 7, after the first time interval T1 after STA1 sends the notification frame, AP1, AP2, and AP3 send first PPDUs.

In a second example embodiment, the architecture of a wireless network is shown in FIG. 1, in which the first communication node is STA1, the second communication node is a non-associated AP of STA1 (that is, at least one of AP2 or AP3), and the third communication node is an associated AP of STA1 (that is, AP1).

Figure 8:
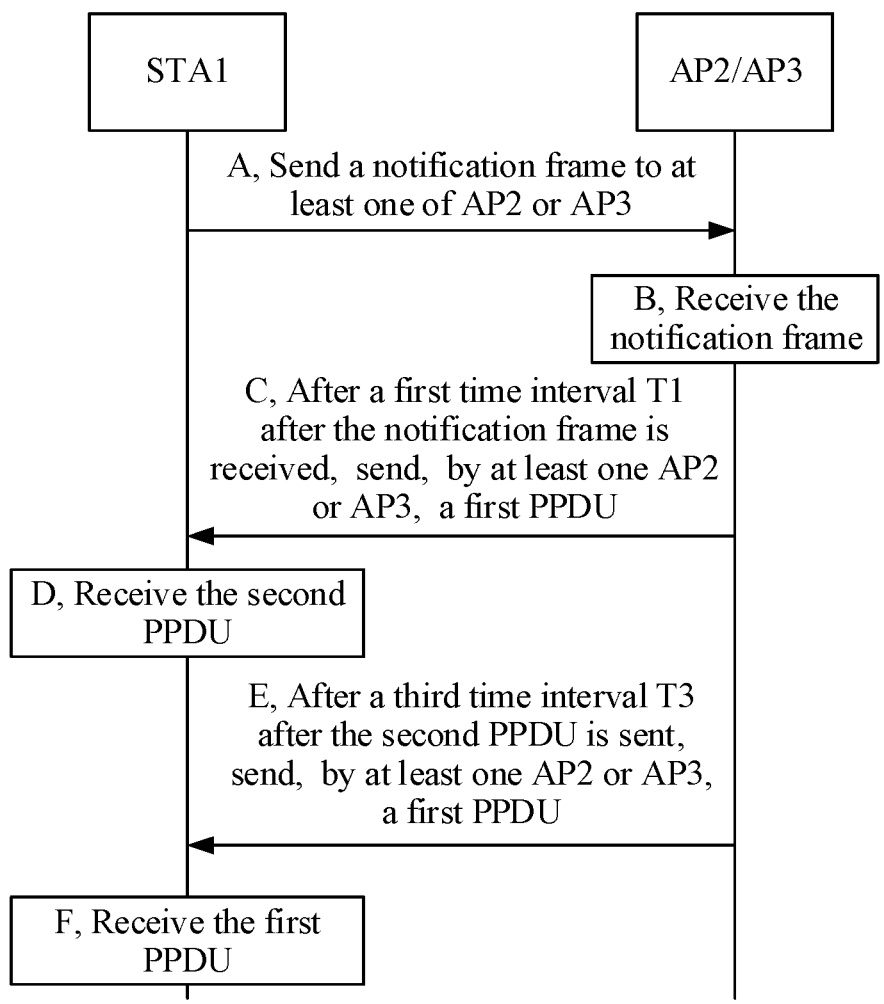
FIG. 8 is an interaction diagram of another transmission method according to an embodiment.

FIG. 8 is an interaction diagram of another transmission method according to an embodiment. As shown in FIG. 8, the method includes A, B, C, D, E, and F.

In A, STA1 sends a notification frame to at least one of AP2 or AP3.

In B, at least one of AP2 or AP3 receives the notification frame sent by STA1.

In C, after a second time interval T2 after the notification frame is received, at least one of AP2 or AP3 sends a second PPDU to STA1, where the second PPDU includes a control frame or a channel measurement notification frame.

In D, STA1 receives the second PPDU sent by at least one of AP2 or AP3.

In an embodiment, the control frame or the channel measurement notification frame includes at least one of: at least one station identification, a multi-user feedback indication, a single-user feedback indication, a space-time flow location index or channel reservation indication information.

In an embodiment, the control frame or the channel measurement notification frame includes at least one station identification, and the at least one station identification may be a MAC address of a station or an association identification of a station. At least one station identification is used for notifying one or more stations that need to perform channel measurement.

In an embodiment, the control frame or the channel measurement notification frame includes the channel reservation indication information, and the channel reservation indication information may be, but is not limited to, duration information. The channel reservation indication information is used for setting a network allocation vector (NAV) of a surrounding station. The value of the channel reservation indication information is calculated according to the duration information in the notification frame or is determined by the second communication node itself. When the value of the channel reservation indication information is determined by the second communication node itself, it means that the second communication node determines the value of the channel reservation indication information according to at least one of a duration for subsequently sending a channel sounding PPDU or a duration required for subsequent measurement feedback.

In E, after a third time interval T3 after the second PPDU is sent, at least one AP2 or AP3 sends a first PPDU to STA1.

In F, STA1 receives the first PPDU sent by at least one of AP2 or AP3.

Figure 9:
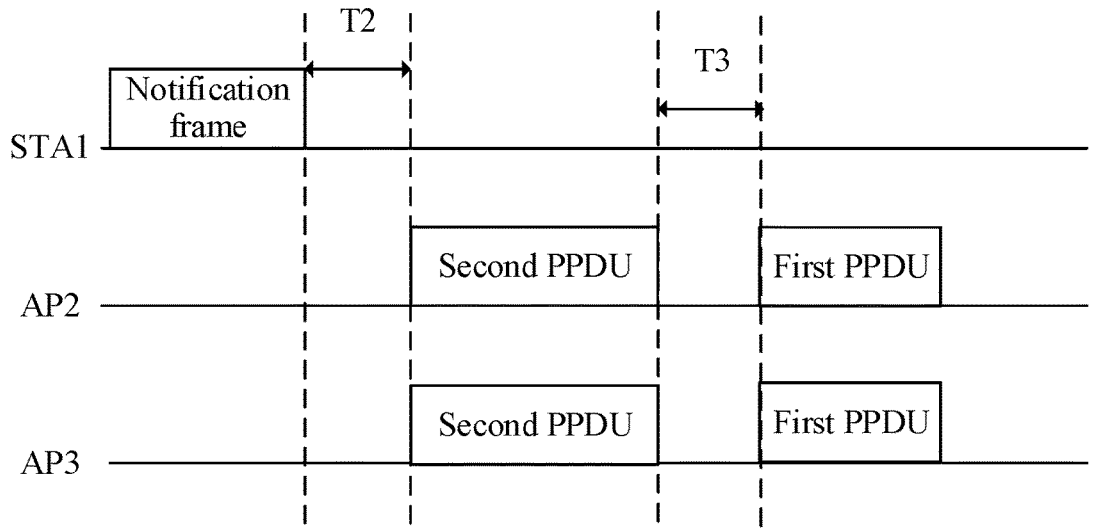
FIG. 9 is a frame interaction sequence diagram of another transmission method according to an embodiment.

FIG. 9 is a frame interaction sequence diagram of another transmission method according to an embodiment. As shown in FIG. 9, after the second time interval T2 after STA1 sends the notification frame, AP2 and AP3 send control frames or channel measurement notification frames, and after the third time interval T3 after the control frames or channel measurement notification frames are sent, AP2 and AP3 send first PPDUs.

In a third example embodiment, the architecture of a wireless network is shown in FIG. 1, in which the first communication node is STA1, the second communication node is a non-associated AP of STA1 (that is, at least one of AP2 or AP3), and the third communication node is an associated AP of STA1 (that is, AP1).

Figure 10:
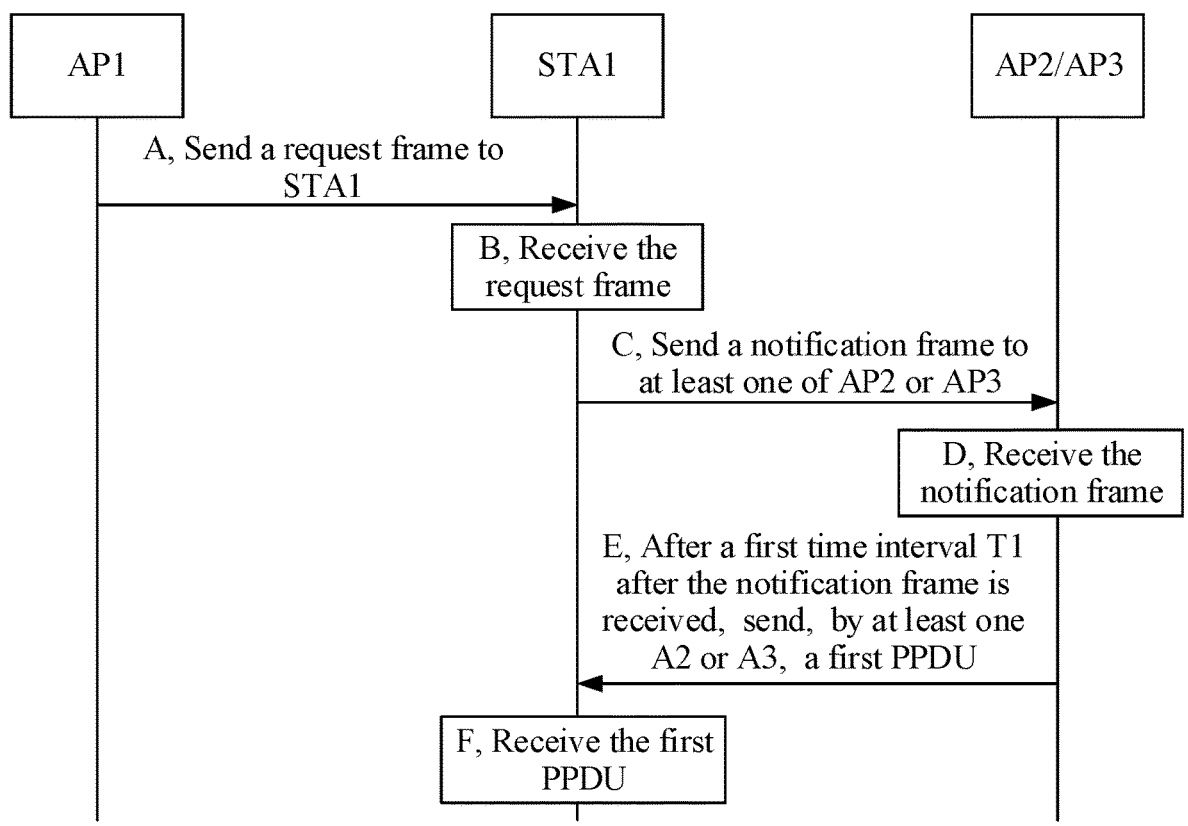
FIG. 10 is an interaction diagram of another transmission method according to an embodiment.

FIG. 10 is an interaction diagram of another transmission method according to an embodiment. As shown in FIG. 10, the method includes A, B, C, D, E, and F.

In A, AP1 sends a request frame to STA1.

In B, STA1 receives the request frame sent by AP1.

In C, STA1 sends a notification frame to at least one of AP2 or AP3.

In D, at least one of AP2 or AP3 receives the notification frame sent by STA1.

In E, after a first time interval T1 after the notification frame is received, at least one A2 or A3 sends a first PPDU to STA1.

In F, STA1 receives the first PPDU sent by at least one of AP2 or AP3.

Figure 11:
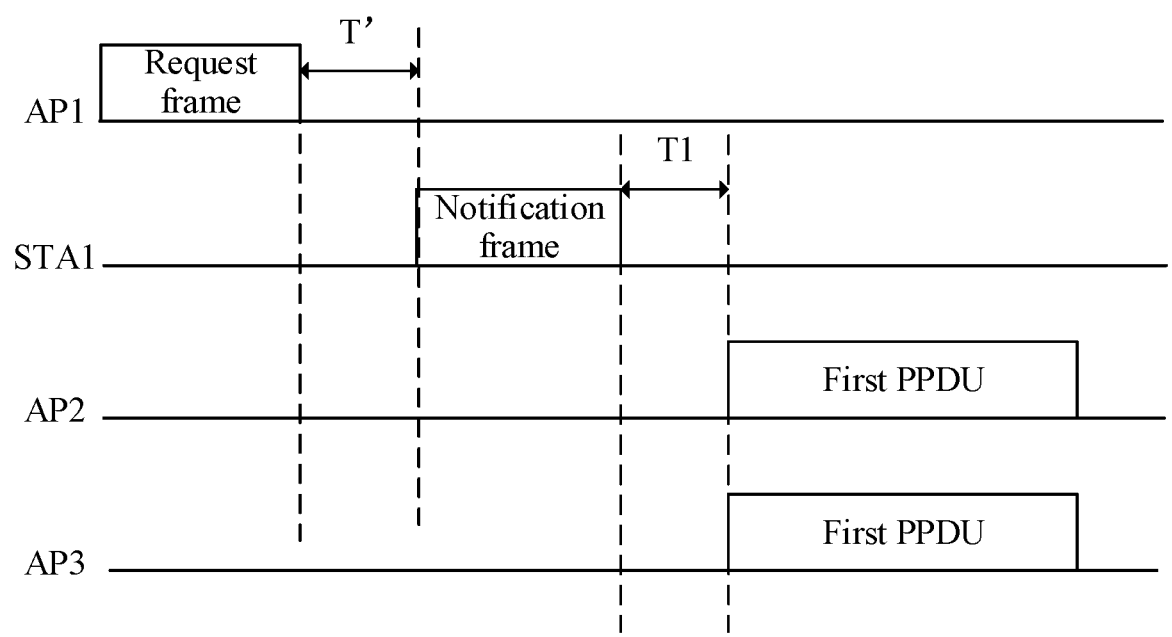
FIG. 11 is a frame interaction sequence diagram of another transmission method according to an embodiment.

FIG. 11 is a frame interaction sequence diagram of another transmission method according to an embodiment. As shown in FIG. 11, after a fixed time interval after AP1 sends the request frame to STA1, STA1 sends the notification frame; and after the first time interval T1 after STA1 sends the notification frame, AP2 and AP3 sends first PPDUs.

In a fourth example embodiment, the architecture of a wireless network is shown in FIG. 1, in which the first communication node is STA1, the second communication node is a non-associated AP of STA1 (that is, at least one of AP2 or AP3), and the third communication node is an associated AP of STA1 (that is, AP1).

Figure 12:
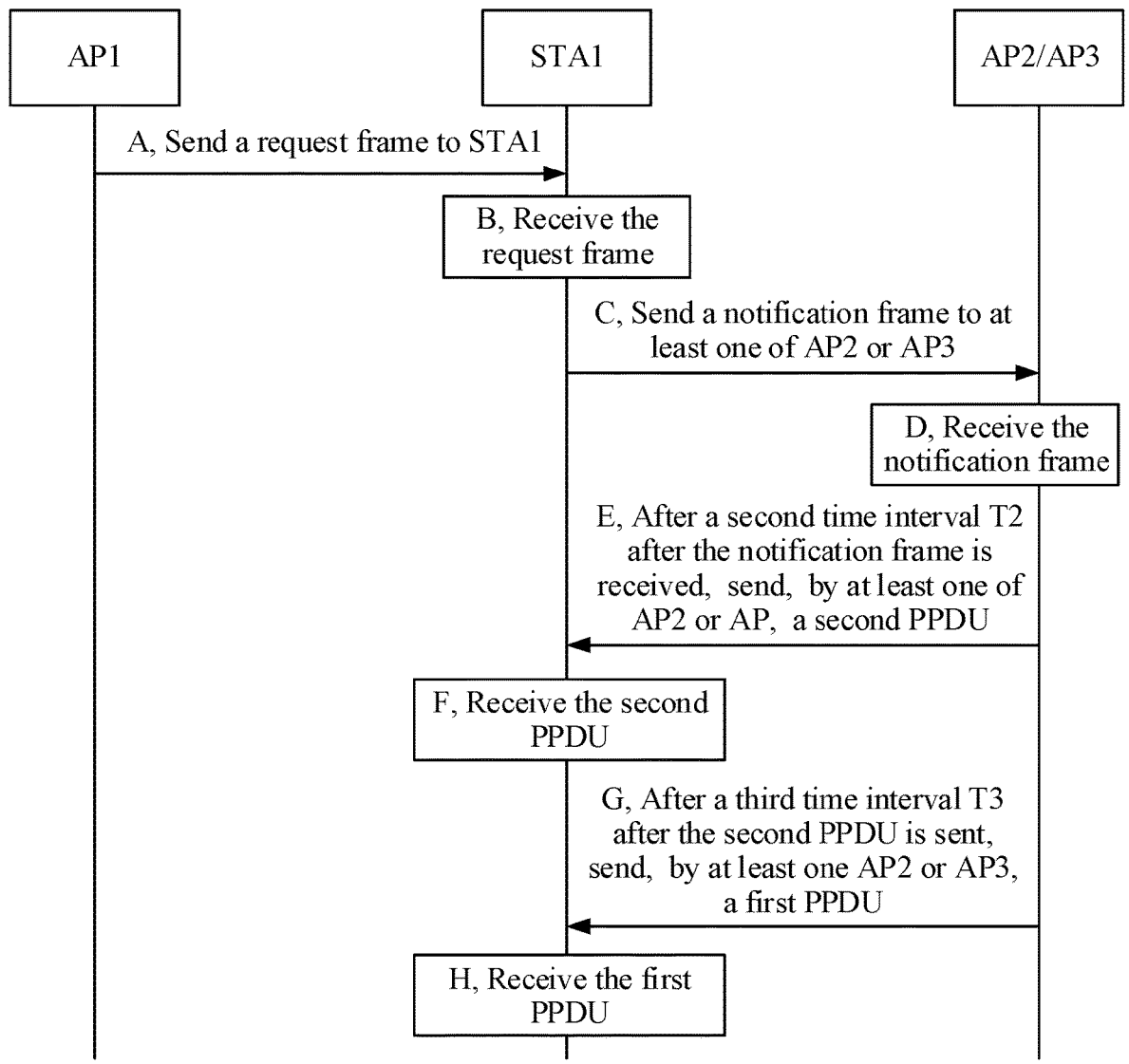
FIG. 12 is an interaction diagram of another transmission method according to an embodiment.

FIG. 12 is an interaction diagram of another transmission method according to an embodiment. As shown in FIG. 12, the method includes A, B, C, D, E, F, G, and H.

In A, AP1 sends a request frame to STA1.

In B, STA1 receives the request frame sent by AP1.

In C, STA1 sends a notification frame to at least one of AP2 or AP3.

In D, at least one of AP2 or AP3 receives the notification frame sent by STA1.

In E, after a second time interval T2 after the notification frame is received, at least one of AP2 or AP3 sends a second PPDU to STA1, where the second PPDU includes a control frame or a channel measurement notification frame.

In F, STA1 receives the second PPDU sent by at least one of AP2 or AP3.

In G, after a third time interval T3 after the second PPDU is sent, at least one AP2 or AP3 sends a first PPDU to STA1.

In H, STA1 receives the first PPDU sent by at least one of AP2 or AP3.

Figure 13:
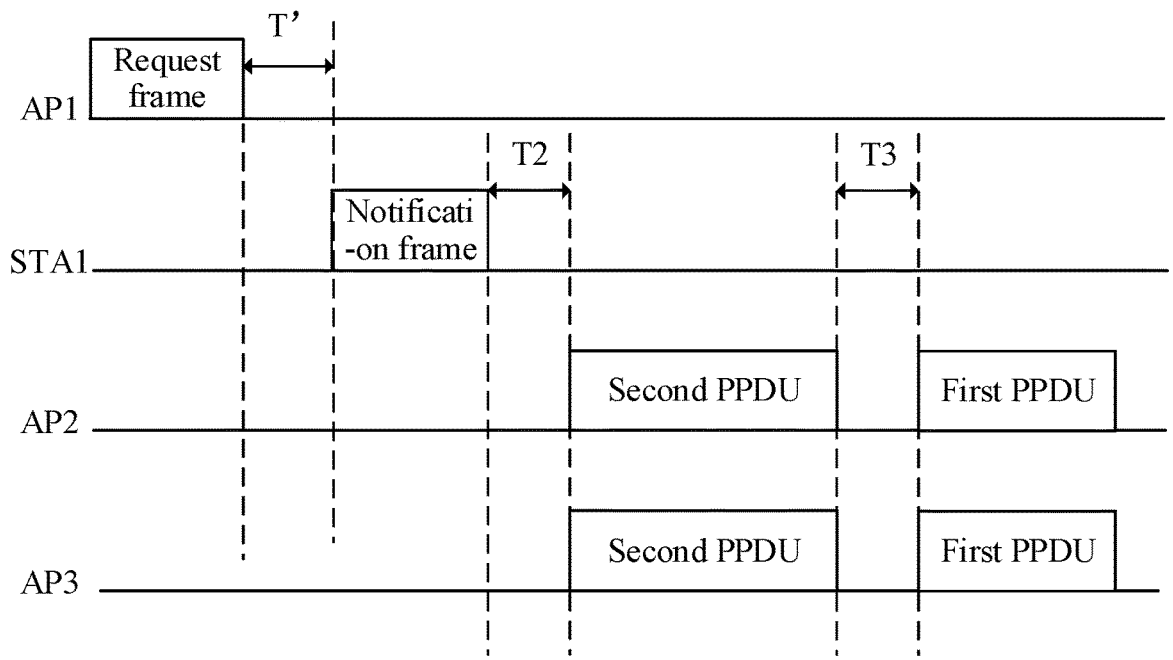
FIG. 13 is a frame interaction sequence diagram of another transmission method according to an embodiment.

FIG. 13 is a frame interaction sequence diagram of another transmission method according to an embodiment. As shown in FIG. 13, after a fixed time interval after AP1 sends the request frame to STA1, STA1 sends the notification frame; after the second time interval T2 after STA1 sends the notification frame, AP2 and AP3 send control frames or channel measurement notification frames; and after the third time interval T3 after the control frames or channel measurement notification frames are sent, AP2 and AP3 send first PPDUs.

Figure 14:
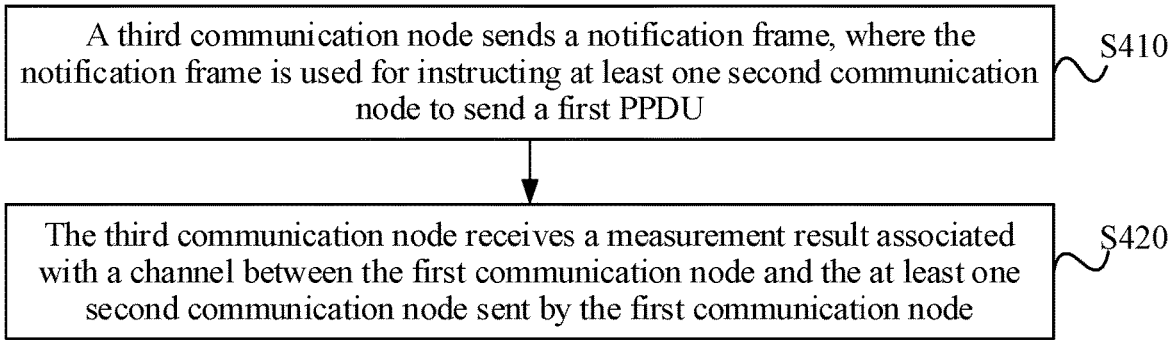
FIG. 14 is a flowchart of another transmission method according to an embodiment.

FIG. 14 is a flowchart of another transmission method according to an embodiment. As shown in FIG. 14, the method provided by this embodiment is applicable to a third communication node, and the third communication node may be an associated AP of an STA. The method includes S410 and S420.

In S410, a third communication node sends a notification frame, where the notification frame is used for instructing at least one second communication node to send a first PPDU.

In an embodiment, the first PPDU includes a channel sounding PPDU or a data frame.

In an embodiment, the notification frame may include at least one of: resource allocation information, access point identification information, related information of the first PPDU, public information, user information, a multi-access point operation indication or an indication of whether to decode a MAC frame header or a PPDU load portion of the notification frame.

In an embodiment, the notification frame may be actively sent by the third communication node, and may also be sent by the third communication node under the trigger of a first communication node, that is, the third communication node receives a request frame sent by the first communication node, and the request frame is used for instructing the third communication node to start a multi-access point operation or send the notification frame.

In S420, the third communication node receives a measurement result associated with the channel between the first communication node and the at least one second communication node sent by the first communication node.

Figure 15:
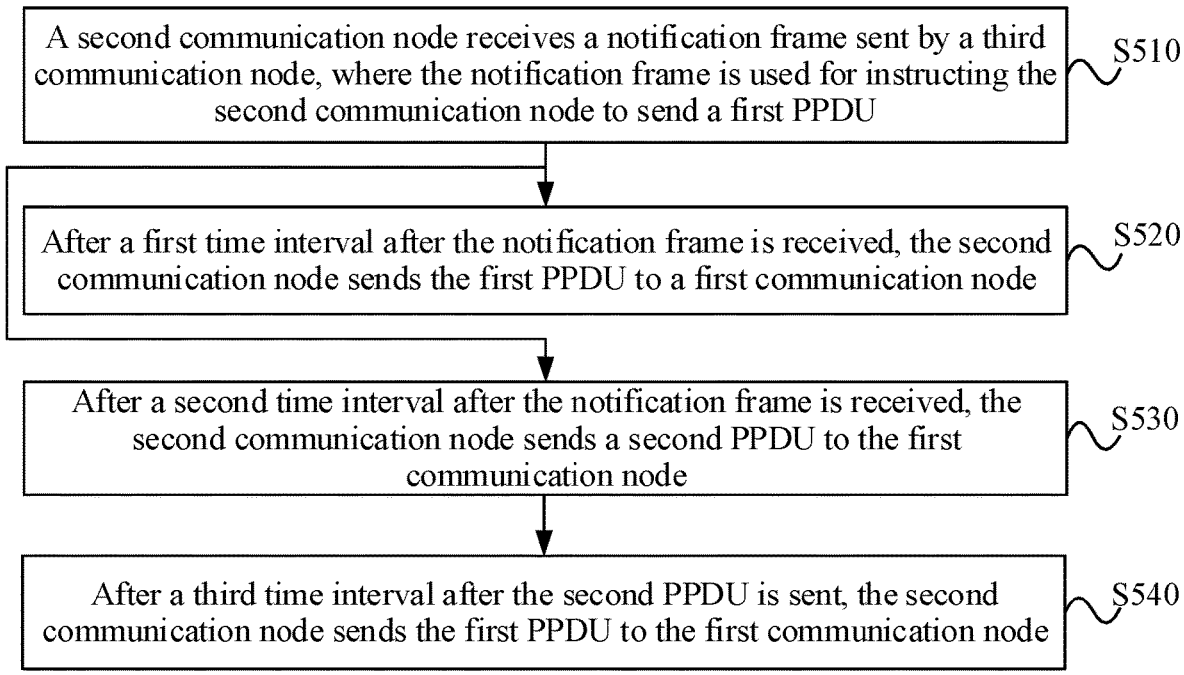
FIG. 15 is a flowchart of another transmission method according to an embodiment.

FIG. 15 is a flowchart of another transmission method according to an embodiment. As shown in FIG. 15, the method provided by this embodiment is applicable to a second communication node, and the second communication node may be a non-associated AP of an STA. The method includes S510, S520, S530, and S540.

In S510, a second communication node receives a notification frame sent by a third communication node, where the notification frame is used for instructing the second communication node to send a first PPDU.

In S520, after a first time interval after the notification frame is received, the second communication node sends the first PPDU to a first communication node.

In an embodiment, the first time interval may be, but is not limited to, a short interframe space or a point coordination function interframe space.

In S530, after a second time interval after the notification frame is received, the second communication node sends a second PPDU to the first communication node, where the second PPDU includes a control frame or a channel measurement notification frame.

In an embodiment, the control frame includes any one of: an acknowledgement frame, an RTS or a CTS.

In an embodiment, the control frame or the channel measurement notification frame includes at least one of: at least one station identification, a multi-user feedback indication, a single-user feedback indication, a space-time flow location index or channel reservation indication information.

In S540, after a third time interval after the second PPDU is sent, the second communication node sends the first PPDU to the first communication node.

In an embodiment, the second time interval may be, but is not limited to, a short interframe space or a point coordination function interframe space, and the third time interval may be, but is not limited to, a short interframe space or a point coordination function interframe space. In an embodiment, the values of the first time interval, the second time interval and the third time interval may be the same or different.

Figure 16:
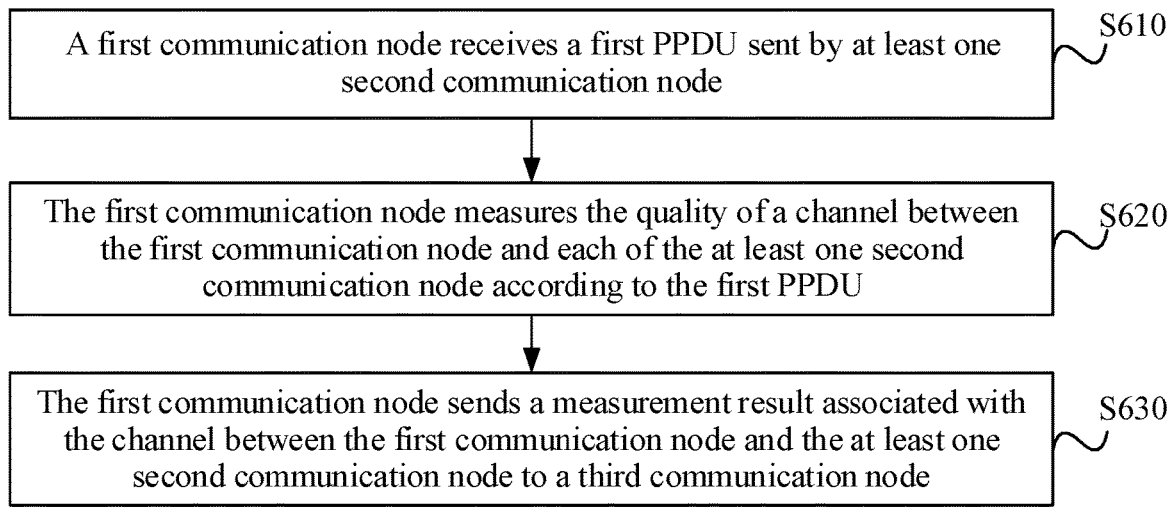
FIG. 16 is a flowchart of another transmission method according to an embodiment.

FIG. 16 is a flowchart of another transmission method according to an embodiment. As shown in FIG. 16, the method provided by this embodiment is applicable to a first communication node, and the first communication node may be an STA (such as a network side device (such as an AP) or a UE). The method includes S610, S620, and S630.

In S610, a first communication node receives a first PPDU sent by at least one second communication node.

In an embodiment, before the execution of S620, the first communication node may also receive a second PPDU sent by the at least one second communication node, where the second PPDU includes a control frame or a channel measurement notification frame.

The control frame includes any one of: an acknowledgement frame, an RTS or a CTS.

In S620, the first communication node measures the quality of a channel between the first communication node and each of the at least one second communication node according to the first PPDU.

In S630, the first communication node sends a measurement result associated with the channel between the first communication node and the at least one second communication node to a third communication node.

In an embodiment, if the notification frame is sent by the third communication node under the trigger of the first communication node, the first communication node may also send a request frame to the third communication node.

In an embodiment, the request frame includes at least one of: access point identification information, duration information, resource allocation information, related information of a first PPDU, a channel measurement start indication, station information, a multi-access point operation indication or a buffer data ready-to-send indication.

Some example embodiments are listed below to illustrate the transmission method provided by the embodiments of the present application.

In a fifth example embodiment, the architecture of a wireless network is shown in FIG. 1, in which the first wireless node is STA1, the second communication node is a non-associated AP of STA1 (that is, at least one of AP2 or AP3), and the third communication node is an associated AP of STA1 (that is, AP1).

Figure 17:
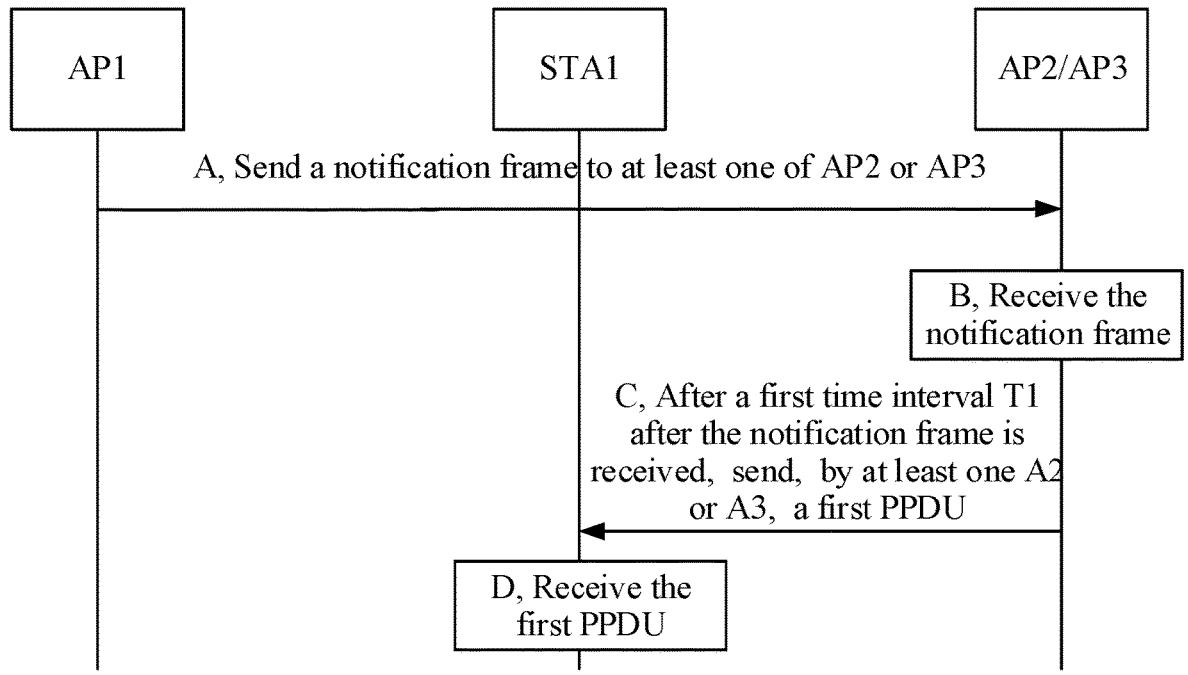
FIG. 17 is an interaction diagram of another transmission method according to an embodiment.

FIG. 17 is an interaction diagram of another transmission method according to an embodiment. As shown in FIG. 17, the method includes A, B, C, and D.

In A, AP1 sends a notification frame to at least one of AP2 or AP3.

In B, at least one of AP2 or AP3 receives the notification frame sent by AP1.

In an embodiment, the notification frame may be a broadcast address frame, a multicast address frame or a unicast frame. When the notification frame is the multicast address frame, the multicast address may be a multicast address or group identity of a group where AP2 and AP3 are located.

In C, after a first time interval T1 after the notification frame is received, at least one A2 or A3 sends a first PPDU to STA1.

In D, STA1 receives the first PPDU sent by at least one of AP2 or AP3.

Figure 18:
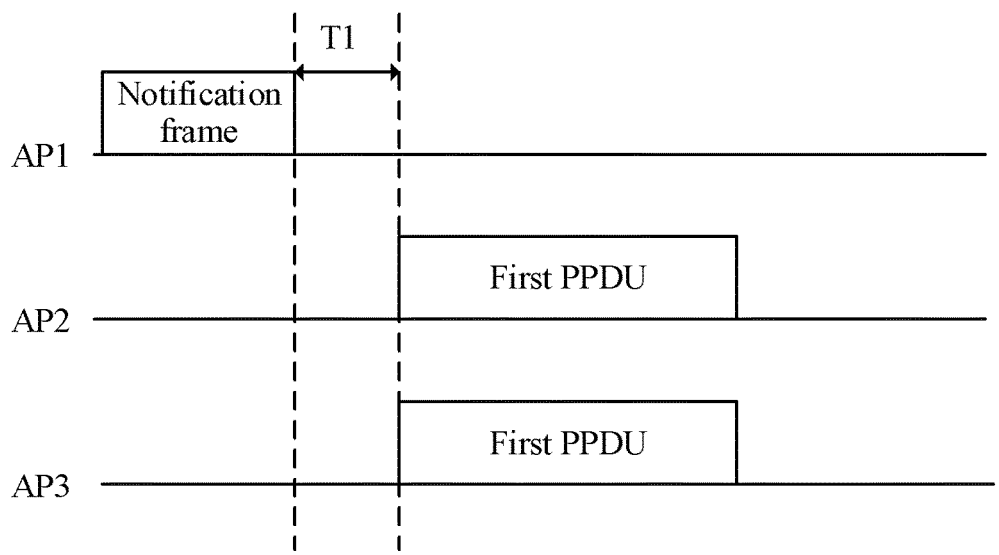
FIG. 18 is a frame interaction sequence diagram of another transmission method according to an embodiment.

FIG. 18 is a frame interaction sequence diagram of another transmission method according to an embodiment.

As shown in FIG. 18, after the first time interval T1 after AP1 sends the notification frame, A2 and A3 send first PPDUs.

In a sixth example embodiment, the architecture of a wireless network is shown in FIG. 1, in which the first communication node is STA1, the second communication node is a non-associated AP of STA1 (that is, at least one of AP2 or AP3), and the third communication node is an associated AP of STA1 (that is, AP1).

Figure 19:
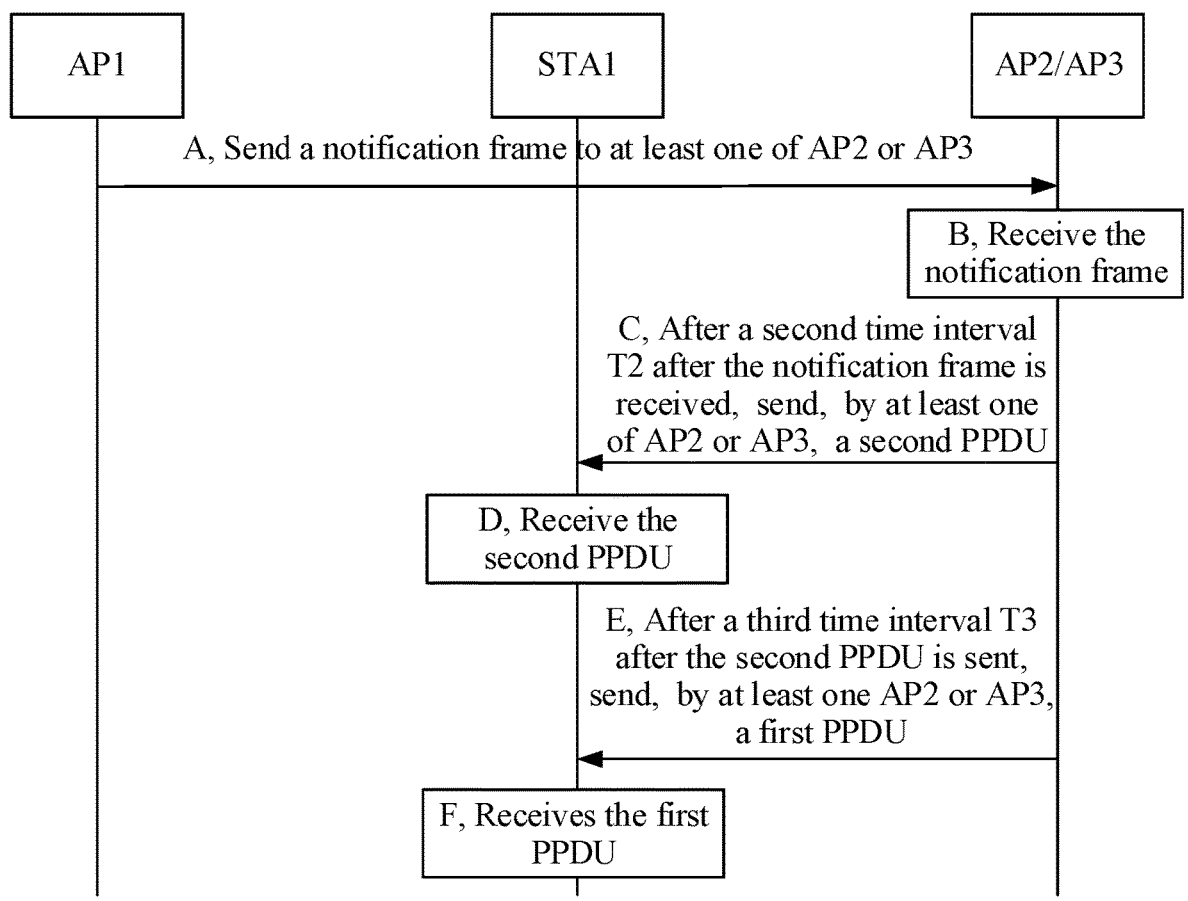
FIG. 19 is an interaction diagram of another transmission method according to an embodiment.

FIG. 19 is an interaction diagram of another transmission method according to an embodiment. As shown in FIG. 19, the method includes A, B, C, D, E, and F.

In A, AP1 sends a notification frame to at least one of AP2 or AP3.

In B, at least one of AP2 or AP3 receives the notification frame sent by AP1.

In C, after a second time interval T2 after the notification frame is received, at least one of AP2 or AP3 sends a second PPDU to STA1, where the second PPDU includes a control frame or a channel measurement notification frame.

In D, STA1 receives the second PPDU sent by at least one of AP2 or AP3.

In an embodiment, the control frame or the channel measurement notification frame includes at least one of: at least one station identification, a multi-user feedback indication, a single-user feedback indication, a space-time flow location index or channel reservation indication information.

In an embodiment, the control frame or the channel measurement notification frame includes at least one station identification, and the at least one station identification may be a MAC address of a station or an association identification of a station. At least one station identification is used for notifying one or more stations that need to perform channel measurement.

In an embodiment, the control frame or the channel measurement notification frame includes the channel reservation indication information, and the channel reservation indication information may be, but is not limited to, duration information. The channel reservation indication information is used for setting a NAV of a surrounding station.

In E, after a third time interval T3 after the second PPDU is sent, at least one AP2 or AP3 sends a first PPDU to STA1.

In F, STA1 receives the first PPDU sent by at least one of AP2 or AP3.

Figure 20:
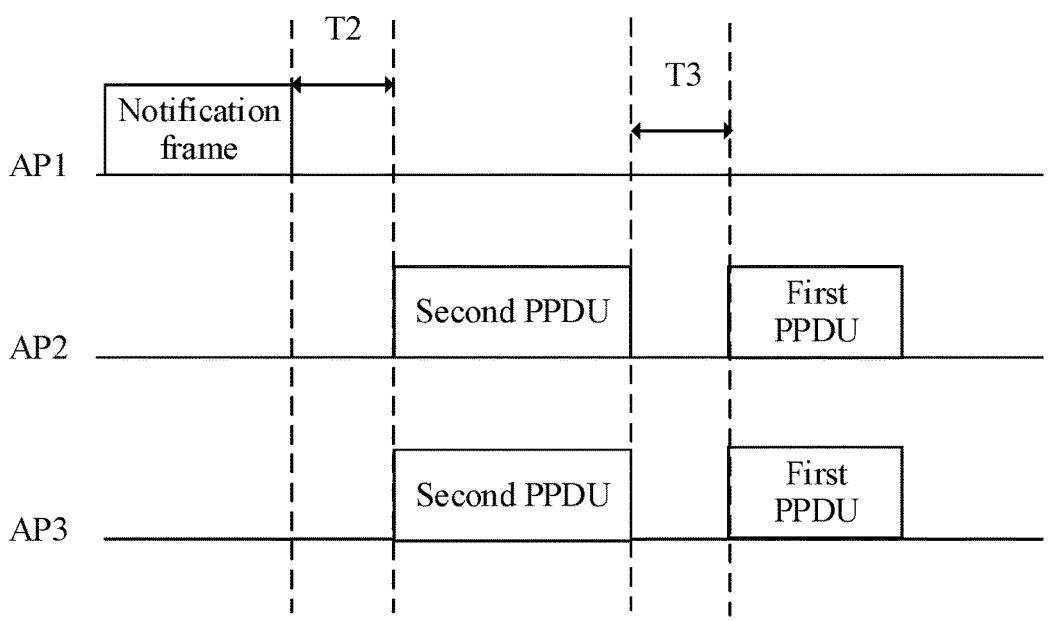
FIG. 20 is a frame interaction sequence diagram of another transmission method according to an embodiment.

FIG. 20 is a frame interaction sequence diagram of another transmission method according to an embodiment. As shown in FIG. 20, after the second time interval T2 after AP1 sends the notification frame, AP2 and AP3 send control frames or channel measurement notification frames, and after the third time interval T3 after the control frames or channel measurement notification frames are sent, AP2 and AP3 send first PPDUs.

In the example embodiments described above, the contents of the first PPDUs sent by different second communication nodes may be the same or different.

Resources used by different second communication nodes to send the first PPDU may be notified in the notification frame. For example, when the resource allocation is performed in a manner of frequency division, different second communication nodes are allocated to send the first PPDU on different resource blocks of the same bandwidth, the resource block used by each second communication node is uniformly distributed over the entire bandwidth, and the resources used by different second communication nodes may be distributed at intervals over the entire bandwidth.

Figure 21:
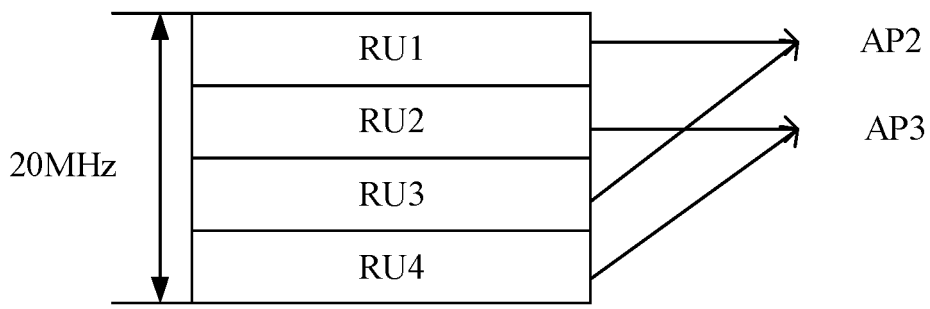
FIG. 21 is a schematic diagram of a resource allocation manner according to an embodiment.

For example, the bandwidth of a to-be-measured channel is 20 MHz, including four resource blocks RU1 to RU4. The resource blocks used by AP2 and AP3 to send the first PPDU at 20 MHz after receiving the notification frame are uniformly distributed over the entire 20 MHz, and the resources used by AP2 and AP3 are distributed at intervals over the entire 20 MHz. FIG. 21 is a schematic diagram of a resource allocation manner according to an embodiment, in which RU1 and RU3 are allocated to AP2 and used for sending the first PPDU, and RU2 and RU4 are allocated to AP3 and used for sending the first PPDU.

Figure 22:
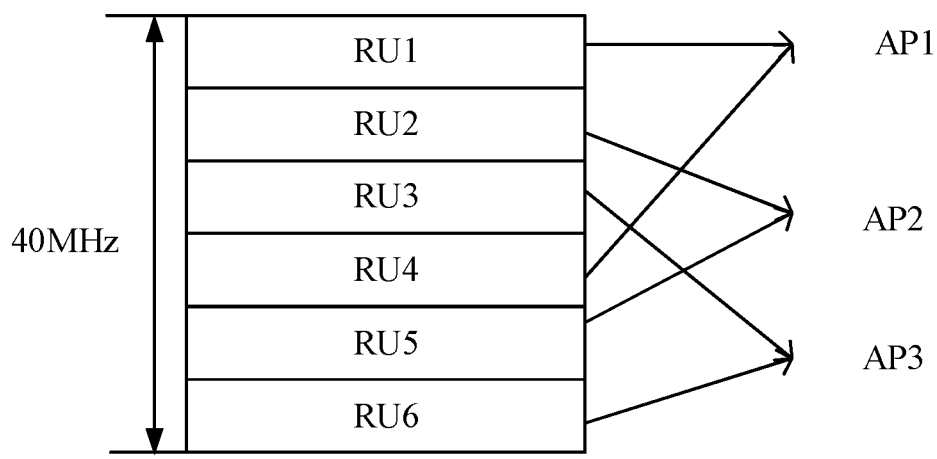
FIG. 22 is a schematic diagram of another resource allocation manner according to an embodiment.

For example, the bandwidth of a to-be-measured channel is 40 MHz, including six resource blocks RU1 to RU6. The resource blocks used by AP1, AP2 and AP3 to send the first PPDU at 40 MHz after receiving the notification frame are uniformly distributed over the entire 40 MHz, and the resources used by AP1, AP2 and AP3 are distributed at intervals over the entire 40 MHz. FIG. 22 is a schematic diagram of another resource allocation manner according to an embodiment, in which RU1 and RU4 are allocated to AP1, RU2 and RU5 are allocated to AP2, and RU3 and RU6 are allocated to AP3.

For example, when a station that needs to perform channel measurement receives a first PPDU, the station may determine APs of a corresponding sender according to resource allocation information which is obtained in advance, perform channel measurement on first PPDUs sent by APs occupying different resource blocks respectively, and obtain the measurement result of the entire bandwidth by interpolation or other operation modes.

Figure 23:
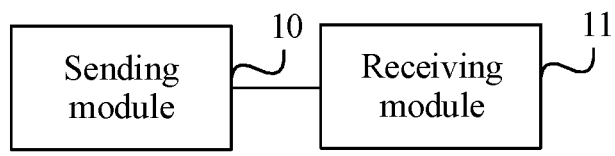
FIG. 23 is a structural schematic diagram of a transmission device according to an embodiment.

FIG. 23 is a structural schematic diagram of a transmission device according to an embodiment. The transmission device may be configured in a first communication node. As shown in FIG. 23, the transmission device includes a sending module 10 and a receiving module 11.

The sending module 10 is configured to send a notification frame, where the notification frame is used for instructing at least one second communication node to send a first PPDU.

The receiving module 11 is configured to receive the first PPDU sent by the at least one second communication node.

The transmission device provided by this embodiment is configured to perform the transmission method of the embodiments described above. The implementation principle and effects of the transmission device provided by this embodiment are similar to those of the transmission method, and the details are not repeated here.

In an embodiment, the first PPDU includes a channel sounding PPDU or a data frame.

Figure 24:
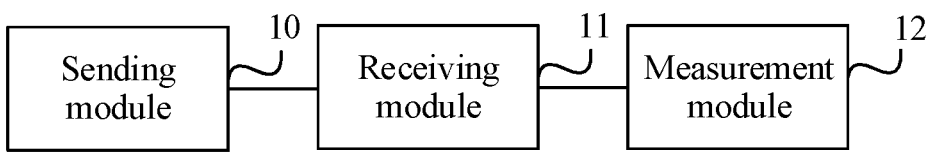
FIG. 24 is a structural schematic diagram of another transmission device according to an embodiment.

In an embodiment, in conjunction with FIG. 23, FIG. 24 is a structural schematic diagram of another transmission device according to an embodiment. The transmission device further includes a measurement module 12.

The measurement module 12 is configured to measure the quality of a channel between the first communication node and each of the at least one second communication node according to the first PPDU.

In an embodiment, the sending module 10 is further configured to send a measurement result associated with the channel between the first communication node and the at least one second communication node to a third communication node.

In an embodiment, the receiving module 11 is further configured to, before the sending module 10 sends the notification frame, receive a request frame sent by the third communication node, where the request frame is used for instructing the first communication node to start a multi-access point operation or to send the notification frame.

In an embodiment, the receiving module 11 is further configured to, before the receiving module 11 receives the first PPDU sent by the at least one second communication node, receive a second PPDU sent by the at least one second communication node, where the second PPDU includes a control frame or a channel measurement notification frame.

In an embodiment, the control frame includes any one of: an acknowledgement frame, an RTS or a CTS.

In an embodiment, the notification frame includes at least one of: resource allocation information, access point identification information, related information of the first PPDU, public information, user information, a multi-access point operation indication or an indication of whether to decode a MAC frame header or a PPDU load portion of the notification frame.

In an embodiment, the notification frame includes the resource allocation information, the resource allocation information is used for indicating information of a resource used by the at least one second communication node for sending the first PPDU, the resource is a frequency domain resource, a spatial domain resource, a time domain resource or a code domain resource, and the resource allocation information is notified by an associated access point of the first communication node, constructed by the first communication node, or predefined.

In an embodiment, the notification frame includes the access point identification information, the access point identification information is used for indicating an identification of a second communication node that is desired to send the first PPDU, and the access point identification information is a MAC address of the at least one second communication node, an identification of a BSS where the at least one second communication node is located or a group member identification negotiated by the associated access point of the first communication node and the at least one second communication node.

In an embodiment, the notification frame includes the related information of the first PPDU, the related information of the first PPDU is used for indicating composition information of the first PPDU sent by the at least one second communication node, and the composition information includes at least one of: signaling information used for constructing the first PPDU, short training sequence information, long training sequence information or a transmission rate.

In an embodiment, the notification frame includes the multi-access point operation indication, and the multi-access point operation indication is at least one of: a multi-access point operation type, starting a multi-access point operation, stopping a multi-access point operation, starting multi-access point channel measurement, stopping multi-access point channel measurement, starting multi-access point joint data transmission, stopping multi-access point joint data transmission, starting multi-access point cooperative data transmission, stopping multi-access point cooperative data transmission, starting multi-access point selection, stopping multi-access point selection, start time of a multi-access point operation, a duration of a multi-access point operation, end time of a multi-access point operation or a start time offset of a multi-access point operation.

In an embodiment, the multi-access point operation type includes at least one of: multi-access point channel measurement, multi-access point joint data transmission, multi-access point cooperative transmission, multi-access point selection, multi-access point cooperative beamforming or multi-access point cooperative interference cancellation.

Figure 25:
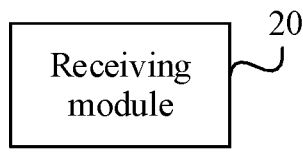
FIG. 25 is a structural schematic diagram of another transmission device according to an embodiment.

FIG. 25 is a structural schematic diagram of another transmission device according to an embodiment. The transmission device may be configured in a second communication node. As shown in FIG. 25, the transmission device includes a receiving module 20.

The receiving module 20 is configured to receive a notification frame sent by a first communication node, where the notification frame is used for instructing at least one second communication node to send a first PPDU.

The transmission device provided by this embodiment is configured to perform the transmission method of the embodiments described above. The implementation principle and effects of the transmission device provided by this embodiment are similar to those of the transmission method, and the details are not repeated here.

Figure 26:
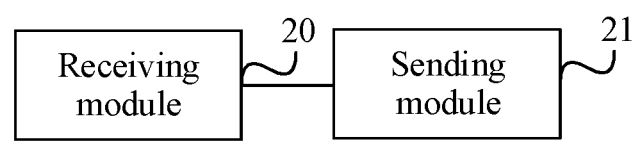
FIG. 26 is a structural schematic diagram of another transmission device according to an embodiment.

In an embodiment, in conjunction with FIG. 25, FIG. 26 is a structural schematic diagram of another transmission device according to an embodiment. The transmission device further includes a sending module 21.

The sending module 21 is configured to, after a first time interval after the notification frame is received, send the first PPDU to the first communication node.

In an embodiment, the sending module 21 is configured to, after a second time interval after the notification frame is received, send a second PPDU to the first communication node, where the second PPDU includes a control frame or a channel measurement notification frame; and after a third time interval after the second PPDU is sent, send the first PPDU to the first communication node.

In an embodiment, the first PPDU includes a channel sounding PPDU or a data frame.

In an embodiment, the control frame includes one of: an acknowledgement frame, an RTS or a CTS, and the control frame includes duration information that is used for setting network allocation vectors of other stations surrounding the second communication node.

In an embodiment, the notification frame includes at least one of: resource allocation information, access point identification information, related information of the first PPDU, public information, user information, a multi-access point operation indication or an indication of whether to decode a MAC frame header or a PPDU load portion of the notification frame.

In an embodiment, the notification frame includes the resource allocation information, and the second communication node sends the first PPDU on a resource indicated by resource allocation information.

In an embodiment, the notification frame includes the access point identification information, the second communication node determines whether to send the first PPDU according to whether the access point identification information includes an access point identification of the second communication node or whether the access point identification information matches the access point identification of the second communication node.

In an embodiment, the notification frame includes the related information of the first PPDU, the second communication node constructs the first PPDU to be sent according to the related information of the first PPDU.

In an embodiment, the notification frame includes the multi-access point operation type, the second communication node performs multi-access point channel measurement, multi-access point joint data transmission, multi-access point cooperative transmission, multi-access point selection, multi-access point cooperative beamforming or multi-access point cooperative interference cancellation according to the multi-access point operation type.

Figure 27:
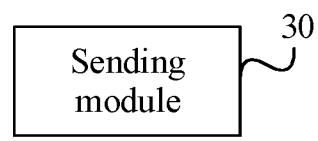
FIG. 27 is a structural schematic diagram of another transmission device according to an embodiment.

FIG. 27 is a structural schematic diagram of another transmission device according to an embodiment. The transmission device may be configured in a third communication node. As shown in FIG. 27, the transmission device includes a sending module 30.

The sending module 30 is configured to send a request frame, where the request frame is used for instructing at least one first communication node to send a notification frame.

The transmission device provided by this embodiment is configured to perform the transmission method of the embodiments described above. The implementation principle and effects of the transmission device provided by this embodiment are similar to those of the transmission method, and the details are not repeated here.

In an embodiment, the request frame includes at least one of: identification information of an access point, duration information, resource allocation information, related information of a first PPDU, a channel measurement close indication, station information, a multi-access point operation indication or a buffer data ready-to-send indication.

In an embodiment, the notification frame is used for instructing at least second communication node to send the first PPDU, and the first PPDU includes a channel sounding PPDU or a data frame.

Figure 28:
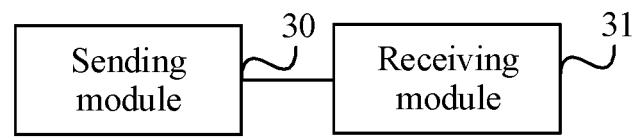
FIG. 28 is a structural schematic diagram of another transmission device according to an embodiment.

In an embodiment, in conjunction with FIG. 27, FIG. 28 is a structural schematic diagram of another transmission device according to an embodiment. The transmission device further includes a receiving module 31.

The receiving module 31 is configured to receive a measurement result associated with the channel between the first communication node and the at least one second communication node sent by the first communication node.

In an embodiment, in a case where the request frame includes the access point identification information, the access point identification information is used for indicating that the at least one first communication node sends the notification frame to an access point identified by the access point identification information, that a multi-access point operation with the access point identified by the access point identification information is started or stopped, or that the access point identified by the access point identification information starts or stops the multi-access point operation.

In an embodiment, the request frame includes the multi-access point operation indication, and the multi-access point operation indication is used for indicating at least one of: a multi-access point operation type, starting a multi-access point operation, stopping a multi-access point operation, starting multi-access point channel measurement, stopping multi-access point channel measurement, starting multi-access point joint data transmission, stopping multi-access point joint data transmission, starting multi-access point cooperative data transmission, stopping multi-access point cooperative data transmission, starting multi-access point selection, stopping multi-access point selection, start time of a multi-access point operation, a duration of a multi-access point operation, end time of a multi-access point operation or a start time offset of a multi-access point operation.

In an embodiment, the request frame includes the buffer data ready-to-send indication, and the buffer data ready-to-send indication is used for indicating that the third communication node has buffered data of the at least one first communication node to send, for indicating starting multi-access point joint data transmission, or for indicating starting multi-access point cooperative data transmission.

An embodiment of the present application further provides a transmission device. The transmission device includes a processor, which is configured to, when executing a computer program, perform the method provided by any one of the embodiments of the present application. Specifically, the transmission device may be the first communication node provided by any one of the embodiments of the present application, may be the second communication node provided by any one of the embodiments of the present application, or may be the third communication node provided by any one of the embodiments of the present application, which is not limited in the present application.

For example, the embodiments described below provide structural schematic diagrams in which the transmission device is a UE and a base station respectively.

Figure 29:
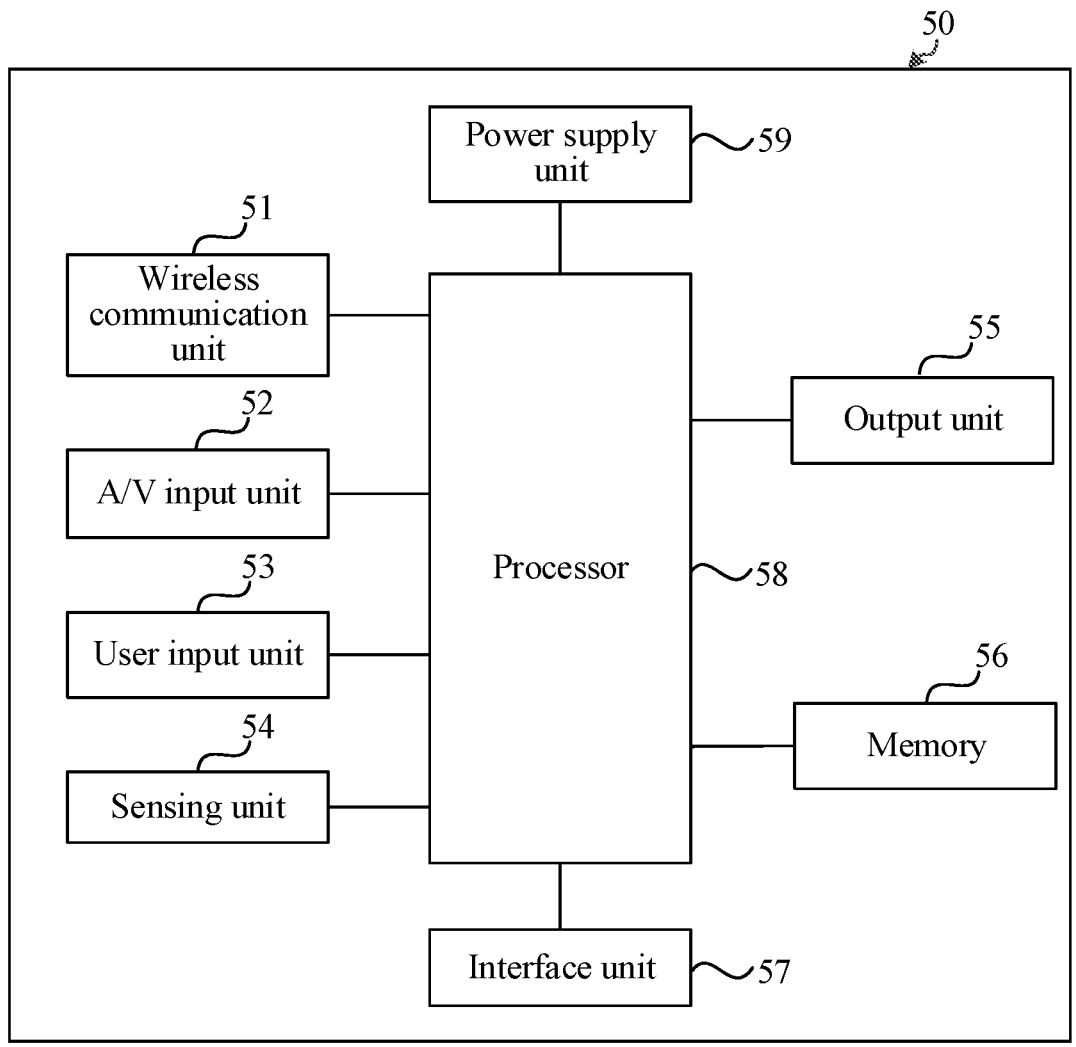
FIG. 29 is a structural schematic diagram of a UE according to an embodiment.

FIG. 29 is a structural schematic diagram of a UE according to an embodiment. The UE may be implemented in multiple forms. The UE in the present application includes, but is not limited to, a mobile terminal device such as a mobile phone, a smart phone, a notebook computer, a digital broadcast receiver, a personal digital assistant (PDA), a portable device (PAD), a portable media player (PMP), a navigation apparatus, a vehicle-mounted terminal device, a vehicle-mounted display terminal and a vehicle-mounted electronic rearview mirror and a fixed terminal device such as a digital television (TV) and a desktop computer.

As shown in FIG. 29, the UE 50 may include a wireless communication unit 51, an audio/video (A/V) input unit 52, a user input unit 53, a sensing unit 54, an output unit 55, a memory 56, an interface unit 57, a processor 58, and a power supply unit 59. FIG. 29 illustrates the UE including multiple assemblies, but it is to be noted that it is not required to implement all the illustrated assemblies. More or fewer assemblies may be implemented instead.

In this embodiment, the wireless communication unit 51 allows the wireless communication between the UE 50 and a base station or a network. The A/V input unit 52 is configured to receive audio or video signals. The user input unit 53 may generate key input data according to commands inputted by the user to control various operations of the UE 50. The sensing unit 54 is configured to detect, for example, the current state of the UE 50, the location of the UE 50, the presence or absence of the user's touch input to the UE 50, the orientation of the UE 50, and the acceleration movement and direction or deceleration movement and direction of the UE 50, and generate commands or signals for controlling the operation of the UE 50. The interface unit 57 serves as an interface through which at least one external apparatus may be connected to the UE 50. The output unit 55 is configured to provide output signals in a visual, audio, and/or tactile manner. The memory 56 may store, for example, a software program for processing and controlling operations executed by the processor 58 or may temporarily store data that has been outputted or is to be outputted. The memory 56 may include at least one type of storage medium. Moreover, the UE 50 may cooperate with a network storage apparatus that performs the storage function of the memory 56 through a network connection. The processor 58 is generally configured to control the overall operation of the UE 50. The power supply unit 59 is configured to receive external or internal power under the control of the processor 58 and provide the appropriate amount of power required for operating various elements and assemblies.

The processor 58 is configured to run the programs stored in the memory 56 to execute at least one function application and data processing, for example, to perform the transmission method provided by the embodiments of the present application.

Figure 30:
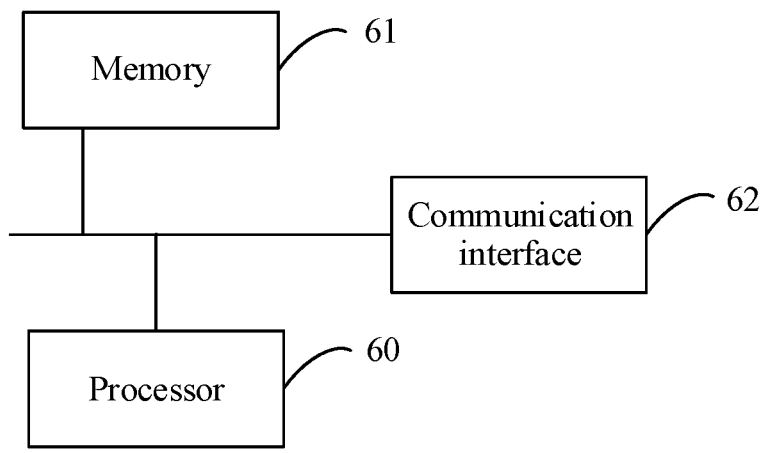
FIG. 30 is a structural schematic diagram of a base station according to an embodiment.

FIG. 30 is a structural schematic diagram of a base station according to an embodiment. As shown in FIG. 30, the base station includes a processor 60, a memory 61, and a communication interface 62. The number of processors 60 in the base station may be one or more, and one processor 60 is illustrated as an example in FIG. 7. The processor 60, the memory 61, and the communication interface 62 in the base station may be connected through a bus or in other manners, and the connection through the bus is illustrated as an example in FIG. 30. The bus represents one or more of several types of bus structures, including a memory bus or a memory controller, a peripheral bus, an accelerated graphics port, a processor or a local bus using any bus structure among multiple bus structures.

As a computer-readable storage medium, the memory 61 may be configured to store software programs, computer-executable programs and modules, such as program instructions/modules corresponding to the method in the embodiments of the present application. The processor 60 is configured to run the software programs, instructions and modules stored in the memory 61 to execute at least one of function applications and data processing of the base station, that is, to perform the transmission method described above.

The memory 61 may include a program storage region and a data storage region. The program storage region may store an operating system and an application program required by at least one function, and the data storage region may store data created depending on use of a terminal. In addition, the memory 61 may include a high-speed random-access memory, and may also include a non-volatile memory such as at least one disk memory, flash memory or other non-volatile solid-state memories. In some examples, the memory 61 may include memories that are remotely disposed with respect to the processor 60, and these remote memories may be connected to the base station via a network. The examples of the preceding network include, but are not limited to, the Internet, an intranet, a network, a mobile communication network, and a combination thereof.

The communications interface 62 may be configured to receive and send data.

An embodiment of the present disclosure further provides a computer-readable storage medium. The computer-readable storage medium is configured to store a computer program which, when executed by a processor, performs the method provided by any one of the embodiments of the present application.

The computer storage medium in this embodiment of the present application may use any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or element, or any combination thereof. The computer-readable storage medium includes (a non-exhaustive list): an electrical connection having one or more wires, a portable computer disk, a hard disk, a random-access memory (RAM), a read-only memory (ROM), an electrically erasable, programmable read-only memory (EPROM), a flash memory, an optical fiber, a portable compact disk read-only memory (CD-ROM), an optical memory device, a magnetic memory device or any suitable combination thereof. In this application, the computer-readable storage medium may be any tangible medium including or storing a program, and the program may be used by or in conjunction with an instruction execution system, apparatus, or element.

The computer-readable signal medium may include a data signal propagated in a baseband or as part of a carrier, and the data signal carries computer-readable program codes. Such a propagated data signal may be in multiple forms, including but not limited to, an electromagnetic signal, an optical signal or any suitable combination thereof. The computer-readable signal medium may further be any computer-readable medium that is not a computer-readable storage medium and that can send, propagate or transmit a program for use by or in connection with an instruction execution system, apparatus or device.

The program codes included on the computer-readable medium may be transmitted on any suitable medium, including but not limited to wireless, wireline, optical fiber cable, radio frequency (RE), etc., or any suitable combination of the foregoing.

Computer program codes for performing the operations of the present disclosure may be written in one or more programming languages or a combination of multiple programming languages. The programming languages include object-oriented programming languages such as Java, Smalltalk, C++, Ruby, and Go, and further include conventional procedural programming languages such as C language or similar programming languages. The program code may be executed entirely on a user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or may be connected to an external computer (for example, through the Internet using an Internet service provider).

It is to be understood by those skilled in the art that the term "user terminal" covers any suitable type of wireless user devices, for example, a mobile phone, a portable data processing apparatus, a portable web browser, or a vehicle-mounted mobile station.

In general, various embodiments of the present application may be implemented in hardware or special purpose circuits, software, logic or any combination thereof. For example, the above-mentioned embodiments, in some aspects, may be implemented in hardware while in other aspects, the embodiments may be implemented in firmware or software that may be executed by a controller, a microprocessor, or other computing devices, which is not limited thereto.

The embodiments of the present application may be implemented by computer program instructions executed by a data processor of a mobile device, such as in the processor entity, or by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow in drawings of the present application may represent program steps, or interconnected logic circuits, modules, and functions, or a combination of program steps and logic circuits, modules and functions. The computer programs may be stored in a memory. The memory may be of any type appropriate for the local technical environment and may be implemented by using any appropriate data storage technology, such as, but not limited to, a read-only memory (ROM), a random-access memory (RAM), an optical storage apparatus and system (a digital video disc (DVD) or a compact disk (CD)), and the like. The computer-readable storage medium may include a non-transitory storage medium. The data processor may be of any type appropriate for the local technical environment, such as, but not limited to, a general-purpose computer, a special-purpose computer, a microprocessor, a digital signal processing (DSP), an application-specific integrated circuit (ASIC), a field-programmable gate array (FPGA), and a processor based on a multi-core processor architecture.

What is claimed is:

1. A transmission method, executed by a first communication node, comprising:
    sending, a notification frame of requesting a first physical layer protocol data unit (PPDU) from at least one second communication node;
    receiving the first PPDU from the at least one second communication node and performing a channel measurement through the first PPDU which is used for performing channel measurement, wherein the first PPDU comprises a channel measurement PPDU; and
    selectively sending a measurement result to at least onea third communication node.

2. The method of claim 1, wherein:
    the sending of the notification frame or a multi-access point operation is triggered by a request frame from a third communication node.

3. The method of claim 1, further comprising:
    receiving a second PPDU from a triggered second communication node which is a response to the notification frame, wherein the second PPDU comprises a control frame or a channel measurement notification frame.

4. The method of claim 3, wherein the control frame comprises one of: an acknowledgement frame, a request-to-send frame (RTS) or a clear-to-send frame (CTS).

5. The method of claim 1, wherein the notification frame comprises at least one of: resource allocation information, access point identification information, related information of the first PPDU, public information, user information, a multi-access point operation indication or an indication of whether to continue decoding a media access control (MAC) frame header or a PPDU load portion of the notification frame.

6. A transmission method, executed by a second communication node, comprising:
    receiving a notification frame from a first communication node; and
    after a fixed time interval, sending a first physical layer protocol data unit (PPDU) to the first communication node, wherein the first PPDU is used for performing channel measurement and comprises a channel measurement PPDU.

7. The method of claim 6, wherein the fixed time interval is a first time interval, or a sum of a second time interval, a duration of sending a second PPDU and a third time interval.

8. The method of claim 7, wherein in a case where the fixed time interval is the sum of the second time interval, the duration of sending the second PPDU and the third time interval, the duration of sending the second PPDU is after the second time interval and prior to the third time interval.

9. A transmission method, executed by a third communication node, comprising:
    sending a request frame to a first communication node, wherein the request frame instructs at least one first communication node to send a notification frame to request a first physical layer protocol data unit (PPDU) from at least one second communication node, wherein the first PPDU is used for performing channel measurement and comprises a channel measurement PPDU.

10. The method of claim 9, wherein the request frame comprises at least one of: access point identification information, duration information, resource allocation information, related information of a first physical layer protocol data unit (PPDU), a channel measurement start indication, station information, a multi-access point operation indication or a buffer data ready-to-send indication.

11. A transmission device, comprising: a processor, which is configured to, when executing a computer program, perform the transmission method of claim 1.

12. A non-transitory computer-readable storage medium storing a computer program which, when executed by a processor, performs the transmission method of claim 1.

13. A transmission device, comprising: a processor, which is configured to, when executing a computer program, perform the transmission method of claim 6.

14. A transmission device, comprising: a processor, which is configured to, when executing a computer program, perform the transmission method of claim 9.

15. The method of claim 1, wherein the first communication node is associated to the at least one second communication node or the at least one third communication node.

* * * * *